(12) United States Patent
Dani et al.

(10) Patent No.: US 9,179,047 B2
(45) Date of Patent: Nov. 3, 2015

(54) SYSTEMS AND METHODS FOR ESTIMATING THE STRUCTURE AND MOTION OF AN OBJECT

(75) Inventors: Ashwin P. Dani, Urbana, IL (US); Warren Dixon, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 11 days.

(21) Appl. No.: 14/126,148

(22) PCT Filed: Jun. 13, 2012

(86) PCT No.: PCT/US2012/042220
§ 371 (c)(1),
(2), (4) Date: Feb. 4, 2014

(87) PCT Pub. No.: WO2012/174090
PCT Pub. Date: Dec. 20, 2012

(65) Prior Publication Data
US 2014/0168461 A1    Jun. 19, 2014

Related U.S. Application Data

(60) Provisional application No. 61/496,191, filed on Jun. 13, 2011.

(51) Int. Cl.
| | | |
|---|---|---|
| H04N 5/225 | (2006.01) | |
| G01B 11/24 | (2006.01) | |
| G06T 7/00 | (2006.01) | |
| G06T 7/20 | (2006.01) | |

(52) U.S. Cl.
CPC .............. *H04N 5/225* (2013.01); *G01B 11/24* (2013.01); *G06T 7/0065* (2013.01); *G06T 7/2033* (2013.01); *G06T 2207/10032* (2013.01); *G06T 2207/30244* (2013.01)

(58) Field of Classification Search
CPC ...... H04N 5/144; H04N 5/145; G06T 7/0051; G06T 7/0065; G06T 7/0071; G06T 7/0075; G06T 7/2013; G06T 7/202; G06T 7/2026; G06T 7/2033; G06T 7/204
See application file for complete search history.

(56) References Cited

U.S. PATENT DOCUMENTS

| | | | | |
|---|---|---|---|---|
| 5,511,153 | A * | 4/1996 | Azarbayejani et al. | 345/419 |
| 6,349,114 | B1 * | 2/2002 | Mory | 375/240.21 |
| 6,661,913 | B1 * | 12/2003 | Zhang et al. | 382/154 |
| 6,788,808 | B1 * | 9/2004 | Van Overveld et al. | 382/154 |
| 6,999,612 | B1 * | 2/2006 | Oliensis | 382/154 |
| 2009/0309966 | A1 | 12/2009 | Chen et al. | |
| 2010/0246893 | A1 * | 9/2010 | Dani et al. | 382/106 |
| 2010/0246899 | A1 * | 9/2010 | Rifai | 382/107 |
| 2011/0206124 | A1 * | 8/2011 | Morphet et al. | 375/240.16 |
| 2011/0317912 | A1 * | 12/2011 | Oh et al. | 382/166 |
| 2012/0170832 | A1 * | 7/2012 | Liu et al. | 382/154 |
| 2013/0069935 | A1 * | 3/2013 | Liu et al. | 345/419 |

(Continued)

OTHER PUBLICATIONS

International Search Report and Written Opinion dated Dec. 26, 2012 in connection with Application No. PCT/US2012/042220.

(Continued)

*Primary Examiner* — Timothy J Henn
(74) *Attorney, Agent, or Firm* — Wolf, Greenfield & Sacks, P.C.

(57) ABSTRACT

In one embodiment, the structure and motion of a stationary object are determined using two images and a linear velocity and linear acceleration of a camera. In another embodiment, the structure and motion of a stationary or moving object are determined using an image and linear and angular velocities of a camera.

35 Claims, 10 Drawing Sheets

(56) References Cited

U.S. PATENT DOCUMENTS

| | | | |
|---|---|---|---|
| 2013/0101177 A1* | 4/2013 | Yamada et al. | 382/107 |
| 2013/0162629 A1* | 6/2013 | Huang et al. | 345/419 |
| 2014/0050357 A1* | 2/2014 | Benhimane et al. | 382/103 |
| 2014/0118494 A1* | 5/2014 | Wu et al. | 348/44 |
| 2014/0153783 A1* | 6/2014 | Tao et al. | 382/106 |

OTHER PUBLICATIONS

International Preliminary Report on Patentability dated Jan. 3, 2014 in connection with Application No. PCT/US2012/042220.

Amara, Object detection and tracking using uncalibrated cameras. University of New Orleans Theses and Dissertations, Paper 1184. 2010.

Dani et al., Structure and motion estimation of a moving object using a moving camera. American Control Conference, Baltimore, MD. Jun. 30, 2010: 6962-6967.

Steffen, Visual SLAM from image sequences acquired by unmanned aerial vehicles. Thesis, Institute of Photogrammetry, University of Bonn. 2009.

\* cited by examiner

SYSTEMS AND METHODS FOR ESTIMATING THE STRUCTURE AND MOTION OF AN OBJECT

CROSS-REFERENCE TO RELATED APPLICATIONS

This application is a national stage application under 35 U.S.C. §371 of International Application No. PCT/US2012/042220, which was filed Jun. 13, 2012 ("the '220 application"). The '220 application claims priority under 35 U.S.C. §119(e) to U.S. Provisional Application Ser. No. 61/496,191, filed Jun. 13, 2011, which is hereby incorporated by reference herein in its entirety.

NOTICE OF FEDERAL SPONSORSHIP

This invention was made with government support under the National Science Foundation (NSF) Career Award Number 0547448, NSF Award Number 0901491, and the Department of Energy Grant Number DE-FG04-86NE37967. The government has certain rights in the invention.

BACKGROUND

In certain situations, it is useful to be able to estimate the structure and motion of an object. For example, it is desirable to estimate the structure and relative motion of stationary or moving objects that an unmanned aerial vehicle (UAV) must avoid. In prior solutions to this problem, knowledge of the Euclidean geometry of the objects or full knowledge of the camera motion of the UAV is required. It would be desirable to have a system and method that do not require that knowledge.

BRIEF DESCRIPTION OF THE DRAWINGS

The disclosed systems and methods can be better understood with reference to the following drawings. The components in the drawings are not necessarily drawn to scale.

DETAILED DESCRIPTION

Figure 1A:
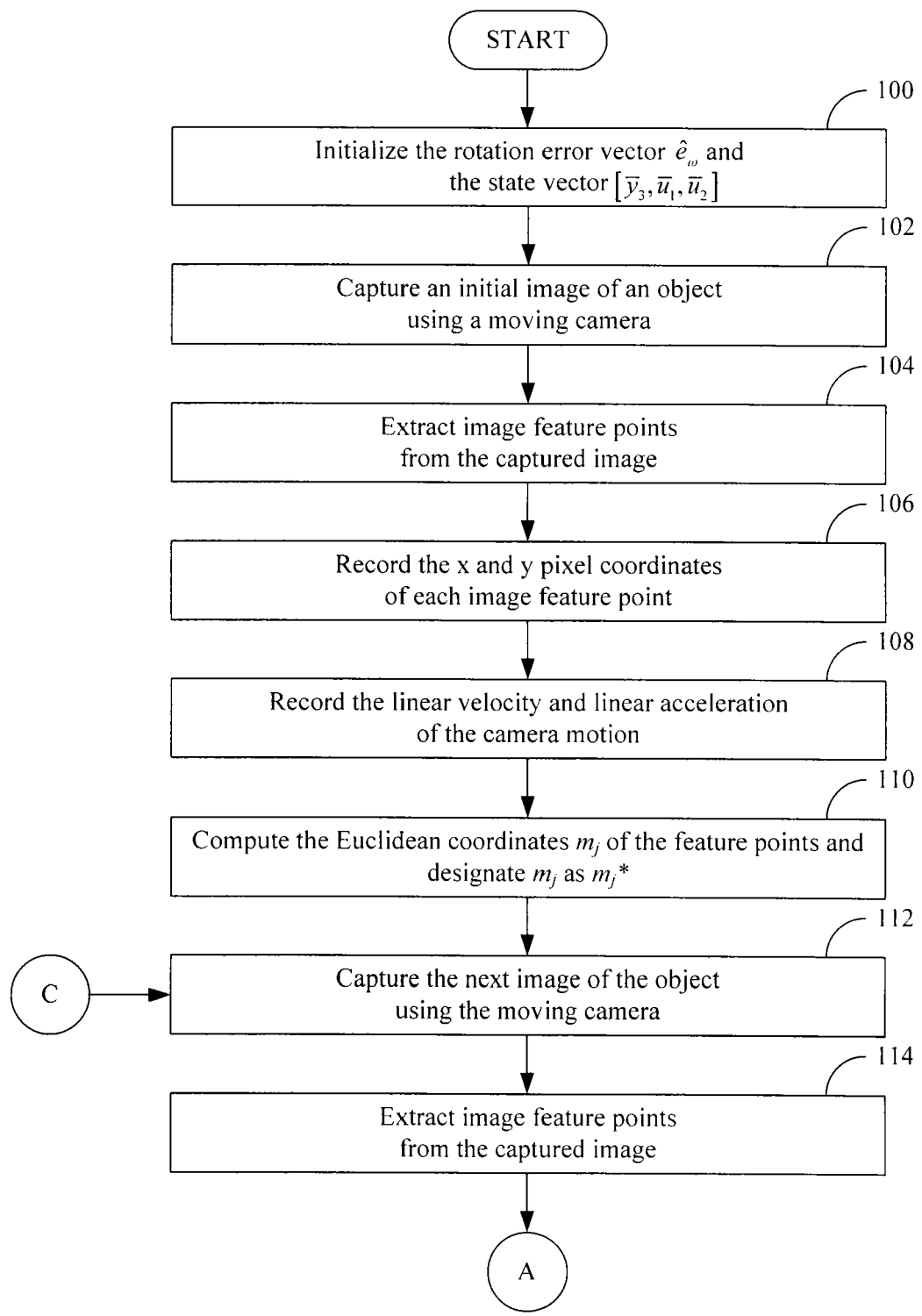
FIGS. 1A-1C comprise a flow diagram of a first embodiment of a method for estimating the structure and motion of a stationary object.

As described above, it would be desirable to be able to estimate the structure and motion of objects without knowledge of the Euclidean geometry of the objects or full knowledge of the camera motion. Disclosed herein are systems and methods in which such structure and motion can be estimated. In some embodiments, the systems and methods can be used to determine the structure and motion of stationary objects. In other embodiments, the systems and methods can be used to determine the structure and motion of stationary and/or moving objects.

In a first embodiment, a reduced order nonlinear observer is proposed for the problem of structure and motion (SaM) estimation of a stationary object observed by a moving calibrated camera. In comparison to existing work which requires some knowledge of the Euclidean geometry of an observed object or full knowledge of the camera motion, the developed reduced order observer only requires one camera linear velocity and corresponding acceleration to asymptotically identify the Euclidean coordinates of the feature points attached to an object (with proper scale reconstruction) and the remaining camera velocities. The unknown linear velocities are assumed to be generated using a model with unknown parameters. The unknown angular velocities are determined from a robust estimator which uses a standard homography decomposition algorithm applied to tracked feature points. A Lyapunov analysis is provided to prove the observer asymptotically estimates the unknown states under a persistency of excitation (PE) condition.

An objective of the classic "structure from motion (SfM)" problem is to estimate the Euclidean coordinates of tracked feature points attached to an object (i.e., three-dimensional (3D) structure) provided the relative motion between the camera and the object is known. The converse of the SfM problem is the "motion from structure (MfS)" problem where the relative motion between the camera and the object is estimated based on known geometry of the tracked feature points attached to an object. An extended problem disclosed herein is a "structure and motion (SaM)" problem where the objective is to estimate the Euclidean geometry of the tracked feature points as well as the relative motion between the camera and tracked feature points. The SaM problem is a fundamental problem and some examples indicate that SaM estimation is only possible up to a scale when a pinhole camera model is used. To recover the scale information, either the linear camera velocities or partial information about the structure of the object, e.g. a known length between two feature points in a scene, is required. In this disclosure, a partial solution to the SaM problem is presented, where the objective is to asymptotically identify the Euclidean 3D coordinates of tracked feature points and the camera motion, provided at least one linear velocity of the camera is known. The angular velocity is estimated using a filter. The estimated angular velocity and a measured linear velocity are combined to estimate the scaled 3D coordinates of the feature points.

Solutions to the SfM, MfS, and the SaM problems can be broadly classified as offline methods (batch methods) and online methods (iterative methods). Batch methods extract an image data set from a given image sequence and then the 3D structure is reconstructed from the data set. These methods are usually based on nonlinear optimization, projective methods, or invariant-based methods. Often, batch methods lack an analytical analysis of convergence. The main drawback of batch methods is that they cannot be used to execute online/real-time tasks. Thus, the need arises for iterative or online methods with analytical guarantees of convergence.

Online methods typically formulate the SfM and MfS problems as a continuous differential equation, where the image dynamics are derived from a continuous image sequence. Online methods often rely on the use of an Extended Kalman filter (EKF). Kalman filter based approaches also lack a convergence guarantee and can converge to wrong solutions in practical scenarios. Also, a priori knowledge about the noise is required for such solutions. In comparison to Kalman filter-based approaches, some researchers have developed nonlinear observers for SfM with analytical proofs of stability. For example, a discontinuous high-gain observer called identifier-based observer (IBO) has been evaluated under the assumption of known camera motion. In one solution, a discontinuous sliding-mode observer is developed which guarantees exponential convergence of the states to an arbitrarily small neighborhood, i.e., uniformly ultimately bounded (UUB) result. A continuous observer which guarantees asymptotic structure estimation has been evaluated under the assumption of known camera motion. An asymptotically stable reduced-order observer has also been evaluated to estimate the structure given known camera motion. Under the assumption that a known Euclidean distance between two feature points is known, a nonlinear observer can be used to asymptotically identify the camera motion. In contrast to these approaches, the methods described in this disclosure do not assume any model knowledge of the structure and only require one linear velocity and the corresponding acceleration.

Various batch and iterative methods have been developed to solve the SaM problem up to a scale. However, in comparison to SfM and MfS results, sparse literature is available where the SaM problem is formulated in terms of continuous image dynamics with associated analytical stability analysis. In one study, an algorithm was presented to estimate the structure and motion parameters up to a scaling factor. In another study, a perspective realization theory for the estimation of the shape and motion of a moving planar object observed using a static camera up to a scale was evaluated. Recently, a nonlinear observer was developed to asymptotically identify the structure given the camera motion (i.e., the SfM problem) or to asymptotically identify the structure and the unknown time-varying angular velocities given all three linear velocities. In a further study structure and linear velocities were estimated given partial structure information such as length between two points on an object, which may be difficult in practice for random objects. In another recent study, the IBO or IBO approach was used to estimate the structure and the constant angular velocity of the camera given all three linear velocities, which not be possible in practical scenarios such as a camera attached to a unmanned vehicle where sideslip velocities may not be available. The problem of estimating structure, time varying angular velocities, and time varying linear velocities of the camera without knowledge of partial structure information remains an unsolved problem.

The technical challenge presented by the SaM problem is that the image dynamics are scaled by an unknown factor, and the unknown structure is multiplied by unknown motion parameters. As described in the following discussions, a challenge is to estimate a state in the open loop dynamics that appears nonlinearly inside a matrix that is multiplied by a vector of unknown linear and angular velocity terms. By assuming that the velocities are known, or some model knowledge exists, previous online efforts have been able to avoid the problem of separately estimating multiplicative uncertainties. One contribution of this disclosure is a strategy to segregate the multiplicative uncertainties, and then to develop a reduced order nonlinear observer to address the SaM problem where the structure (i.e., the properly scaled relative Euclidean coordinates of tracked feature points), the time-varying angular velocities, and two unknown time-varying linear velocities are estimated (i.e., one relative linear velocity is assumed to be known along with a corresponding acceleration). The result exploits an uncertain locally Lipschitz model of the unknown linear velocities of the camera. The strategic use of a standard homography decomposition is used to estimate the angular velocities, provided the intrinsic camera calibration parameters are known and feature points can be tracked between images. A persistency of excitation (PE) condition is formulated, which provides an observability condition that can be physically interpreted as the known camera linear velocity should not be zero over any small interval of time, and the camera should not be moving along the projected ray of a point being tracked. A Lyapunov-based analysis is provided that indicates the SaM observer errors are globally asymptotically regulated provided the PE condition is satisfied. By developing a reduced order observer to segregate and estimate the multiplicative uncertainties, new applications can be addressed including: range and velocity estimation using a camera fixed to a moving vehicle where only the forward velocity/acceleration of the vehicle is known, range and velocity estimation using an unmanned air vehicle (UAV) using only a forward velocity/acceleration sensors, etc.

Consider a moving camera that views four or more planar and non-collinear feature points (denoted by $j=\{1, 2, \ldots, n\}$ $\forall n \geq 4$) lying fixed in a visible plane $\pi_r$, attached to an object in front of the camera. Let $F_r$ be a static coordinate frame attached to the object. A static reference orthogonal coordinate frame $F_c^*$ is attached to the camera at the location corresponding to an initial point in time $t_0$ where the object is in the camera field of view (FOV). After the initial time, an orthogonal coordinate frame $F_c$ attached to the camera undergoes some rotation $\bar{R}(t) \in SO(3)$ and translation $\bar{x}_f(t) \in \mathbb{R}^3$ away from $FF_c^*$.

The Euclidean coordinates $\bar{m}_j(t) \in \mathbb{R}^3$ of the feature points expressed in the current camera frame $F_c$ and the respective normalized Euclidean coordinates $m_j(t) \in \mathbb{R}^3$ are defined as $$\bar{m}_j(t) = [x_{1j}(t) \ x_{2j}(t) \ x_{3j}(t)]^T, \quad (1)$$

$$m_j(t) = \left[\frac{x_{1j}(t)}{x_{3j}(t)} \frac{x_{2j}(t)}{x_{3j}(t)} 1\right]^T.$$

The constant Euclidean coordinates and the normalized coordinates of the feature points expressed in the camera frame $F_c^*$ are denoted by $\bar{m}_j^* \in \mathbb{R}^3$, and $m_j^* \in \mathbb{R}^3$ respectively and are given by Equation (1) superscripted by a '*'. Consider a closed and bounded set $y \subset \mathbb{R}^3$. Auxiliary state vectors $y_j^* = [y_{1j}^*, y_{2j}^*, y_{3j}^*]^T \in y$ and $y_j(t) = [y_{1j}(t), y_{2j}(t), y_{3j}]^T \in y$ are constructed from Equation (1) as $$y_j^* = \left[\frac{x_{1j}^*}{x_{3j}^*} \frac{x_{2j}^*}{x_{3j}^*} \frac{1}{x_{3j}^*}\right]^T, \quad (2)$$

$$y_j = \left[\frac{x_{1j}}{x_{3j}} \frac{x_{2j}}{x_{3j}} \frac{1}{x_{3j}}\right]^T.$$

The corresponding feature points $m_j^*$ and $m_j(t)$ viewed by the camera from two different locations (and two different instances in time) are related by a depth ratio $$\alpha_j(t) \triangleq \frac{x_{3j}^*}{x_{3j}} \in \mathbb{R}$$

and a homography matrix $H(t) \in \mathbb{R}^{3 \times 3}$ as $$m_j = \alpha_j H m_j^*. \qquad (3)$$

The homography matrix can be decomposed to obtain a rotation and scaled translation of the camera between two views. The decomposition of the homography leads to two solutions, one of which is physically relevant. Using projective geometry, the normalized Euclidean coordinates $m_j^*$ and $m_j(t)$ can be related to the pixel coordinates in the image space as $$p_j = A m_j, p_j^* = A m_j^* \qquad (4)$$

where $p_j(t) = [u_j, v_j, 1]^T$ is a vector of the image-space feature point coordinates $u_j(t)$, $v_j(t) \in \mathbb{R}$ defined on the closed and bounded set $I \subset \mathbb{R}^3$, and $A \in \mathbb{R}^{3 \times 3}$ is a constant, known, invertible intrinsic camera calibration matrix. Since A is known, Equation (4) can be used to recover $m_j(t)$, which can be used to partially reconstruct the state $y(t)$.

Assumption 1:

The relative Euclidean distance $x_{3j}(t)$ between the camera and the feature points observed on the target is upper and lower bounded by some known positive constants (i.e., the object remains within some finite distance away from the camera).

Remark 1:

The definition in Equation (2) along with Assumption 1 can be used to conclude that $y_3(t)$ remains in a set $\Omega$ defined as $\Omega = \{y_3 | \underline{y}_3 \leq y_3 \leq \overline{y}_3\}$ where $\overline{y}_3$, $\underline{y}_3 \in \mathbb{R}$ denote known positive bounding constants. Likewise, since the image coordinates are constrained (i.e., the target remains in the camera field of view) the relationships in Equations (1), (2), and (4) along with the fact that A is invertible can be used to conclude that $\overline{y}_1 \geq |y_{1j}(t)| \geq \underline{y}_1$, $\overline{y}_2 \geq |y_{2j}(t)| \geq \underline{y}_2$ where $\overline{y}_1$, $\overline{y}_2$, $\underline{y}_1$, $\underline{y}_2 \in \mathbb{R}$ denote known positive bounding constants. Furthermore, the velocity parameters of the camera are bounded by constants.

At some spatiotemporal instant, the camera views a point q on the object. The point q can be expressed in the coordinate system $F_c$ as $$\overline{m} = x_f + R x_{o'q} \qquad (5)$$

where $x_{o'q}$ is a vector from the origin of the static coordinate system $F_r$, attached to the object at the point q. By differentiating Equation (5), the relative motion of q can be expressed as $$\dot{\overline{m}} = [\omega]_\times \overline{m} + b$$

where $\overline{m}(t)$ is defined in Equation (1), $[\omega]_\times \in \mathbb{R}_{3 \times 3}$ denotes a skew symmetric matrix formed from the angular velocity vector of the camera $\omega(t) = [\omega_1, \omega_2, \omega_3]^T \in W \omega_3^T \in W$, and $b(t) = [b_1, b_2, b_3]^T \in B$ denotes the linear velocity of the camera. The sets W and B are closed and bounded sets such that $W \subset \mathbb{R}^3$ and $B \subset \mathbb{R}^3$. Using Equations (2) and (5), the dynamics of the partially measurable state $y(t)$ can be expressed as $$\begin{bmatrix} \dot{y}_1 \\ \dot{y}_2 \\ \dot{y}_3 \end{bmatrix} = \begin{bmatrix} y_3 & 0 & -y_1 y_3 & -y_1 y_2 & 1+y_1^2 & -y_2 \\ 0 & y_3 & -y_2 y_3 & -(1+y_2^2) & y_1 y_2 & y_1 \\ 0 & 0 & y_3^2 & y_2 y_3 & -y_1 y_3 & 0 \end{bmatrix} \begin{bmatrix} b \\ \omega \end{bmatrix} \qquad (6)$$

where $y_1(t)$ and $y_2(t)$ can be measured through the transformation in Equation (4).

An estimator can be designed for the perspective dynamic system in Equation (6), where the angular velocity is considered unknown and only one of the linear velocities (i.e., $b_3$) and respective acceleration (i.e., $\dot{b}_3$) is available. Moreover, an uncertain dynamic model of the linear velocity b(t) is assumed to be available as $$\dot{b}_i(t) = q(b_i, t) b_i, \forall i = \{1, 2\} \qquad (7)$$

where $q(b_i, t) \in \mathbb{R}$ is a known locally Lipschitz function of unknown states. To facilitate the design and analysis of the subsequent observer, a new state $$u(t) \in U \subset \mathbb{R}^2 \triangleq [u_1(t) = y_3 b_1, u_2(t) = y_3 b_2]^T,$$

is defined where U is a closed and bounded set. After utilizing Equations (6) and (7), the dynamics for $u_1(t)$, $u_2(t)$ can be expressed as $$\dot{u}_i = y_3 b_3 u_i + (y_2 \omega_1 - y_1 \omega_2) u_i + q(b_i) u_i, \forall i = \{1, 2\}. \qquad (8)$$

From Equations (6) and (8) the dynamics of the known states $y_1(t)$, $y_2(t)$ and the unknown state $\theta(t) = [y_3 \ u_1 \ u_2]^T$ are $$\begin{bmatrix} \dot{y}_1 \\ \dot{y}_2 \end{bmatrix} = \underbrace{\begin{bmatrix} -y_1 b_3 & 1 & 0 \\ -y_2 b_3 & 0 & 1 \end{bmatrix}}_{J(y, b_3)} \begin{bmatrix} y_3 \\ u_1 \\ u_2 \end{bmatrix} + \underbrace{\begin{bmatrix} -y_1 y_2 \omega_1 + (1+y_1^2)\omega_2 - y_2 \omega_3 \\ -(1+y_2^2)\omega_1 + y_1 y_2 \omega_2 + y_1 \omega_3 \end{bmatrix}}_{\psi(y,\omega)} \qquad (9)$$

and $$\begin{bmatrix} \dot{y}_3 \\ \dot{u}_1 \\ \dot{u}_2 \end{bmatrix} = \underbrace{\begin{bmatrix} y_3^2 b_3 + (y_2 \omega_1 - y_1 \omega_2) y_3 \\ y_3 b_3 u_1 + (y_2 \omega_1 - y_1 \omega_2) u_1 + q(b_1) u_1 \\ y_3 b_3 u_2 + (y_2 \omega_1 - y_1 \omega_2) u_2 + q(b_2) u_2 \end{bmatrix}}_{g(\theta, \omega, y_1, y_2, b_3)}. \qquad (10)$$

Since $y_1(t)$ and $y_2(t)$ are measurable, from Equations (1) and (4) the Euclidean structure $\overline{m}(t)$ can be estimated once the state $y_3(t)$ is determined. Since the dynamics of the outputs $y_1(t)$, $y_2(t)$ are affine in the unknown state $\theta(t)$, a reduced order observer can be developed based on this relationship for the unknown state $\theta(t)$. The subsequent development is based on the strategy of constructing the estimates $$\hat{\theta}(t) \triangleq [\hat{y}_3 \ \hat{u}_1 \ \hat{u}_2]^T \in \mathbb{R}^3.$$

To quantify the SaM estimation objective, an estimation error $\tilde{\theta}(t) = [\tilde{\theta}_1 \ \tilde{\theta}_2 \ \tilde{\theta}_3]^T \in \mathbb{R}^3$ is defined as $$\tilde{\theta}(t) \triangleq [y_3 - \hat{y}_3 \ u_1 - \hat{u}_1 \ u_2 - \hat{u}_2]^T. \qquad (11)$$

Assumption 2:

The function $q(b_i, t) \ \forall i = \{1, 2\}$ is locally Lipschitz where $q(b_1) - q(\hat{b}_1) = \lambda_1 (b_1 - \hat{b}_1)$ and $q(b_2) - q(\hat{b}_2) = \lambda_2 (b_2 - \hat{b}_2)$ where $\lambda_1$ and $\lambda_2$ are Lipschitz constants.

Remark 2:

The linear velocity model in Equation (7) is restricted to motions that are satisfied by Assumption 2; yet, various classes of trajectories satisfy this assumption (e.g., straight line trajectories, circles, some periodic trajectories, etc.).

Assumption 3:

The function $J(y_1, y_2, b_3)$ defined in Equation (9) satisfies the persistency of excitation condition, i.e., $\exists \gamma, \delta > 0: \int_t^{t+\delta} J^T(y_1(\tau), y_2(\tau)) J(y_1(\tau), b_3(\tau)) d\tau \geq \gamma I \forall t \geq 0$.

Remark 3:

Assumption 3 is violated if $\exists t_1 | \exists t > t_1$, $b_3(t) = 0$ or $y_1(t) = c_1$, $y_2(t) = c_2$. That is, Assumption 3 is valid unless there exists a time $t_1$ such that for all $t > t_1$ the camera translates along the projected ray of an observed feature point.

Assumption 4:

The linear camera velocities $b(t)$ are upper and lower bounded by constants.

Remark 4:

The following bounds can be developed using Assumption 1, Remark 1 and the definitions of $u_1(t)$ and $u_2(t)$ $$u_{1min} \leq u_1 \leq u_{1max}, u_{2min} \leq u_2 \leq u_{2max}.$$

Step I:

Angular Velocity Estimation Solutions are known that can be used to determine the relative angular velocity between the camera and a target. To quantify the rotation mismatch between $F_c^*$ and $F_c$, a rotation error vector $e_\omega(t) \in \mathbb{R}$ is defined by the angle-axis representation as $$e_\omega \overset{\Delta}{=} u_\omega(t) \theta_\omega(t) \quad (12)$$

where $u_\omega(t) \in \mathbb{R}^3$ represents a unit rotation axis, and $\theta_\omega(t) \in \mathbb{R}$ denotes the rotation angle about $u_\omega(t)$ that is assumed to be confined to region $-\pi < \theta_\omega(t) < \pi$. The angle $\theta_\omega(t)$ and axis $u_\omega(t)$ can be computed using the rotation matrix $\bar{R}(t)$ obtained by decomposing the homography matrix $H(t)$ given by the relation in Equation (3). Taking time derivative of Equation (12) yields $$\dot{e}_\omega = L_\omega \omega \quad (13)$$

where $L_\omega(t) \in \mathbb{R}^{3\times 3}$ denotes an invertible Jacobian matrix. A robust integral of the sign of the error (RISE)-based observer $\hat{e}_\omega(t) \in \mathbb{R}^3$ is generated as $$\hat{e}_\omega = (K_\omega + I_{3\times 3}) \tilde{e}_\omega(t) \int_{t_0}^t (K_\omega + I_{3\times 3}) \tilde{e}_\omega d\tau + \nu$$

$$\dot{\nu} = \rho_\omega \text{sgn}(\tilde{e}_\omega) \quad (14)$$

where $K_\omega, \rho_\omega \in \mathbb{R}^{3\times 3}$ positive constant diagonal gain matrices, and $\tilde{e}_\omega(t) \in \mathbb{R}^3$ quantifies the observer error as $$\tilde{e}_\omega(t) \overset{\Delta}{=} e_\omega - \hat{e}_\omega.$$

A Lyapunov-based stability analysis proves $$\dot{\tilde{e}}_\omega(t) - \dot{e}_\omega(t) \to 0 \text{ as } t \to \infty \quad (15)$$

and that all closed-loop signals are bounded. Based on Equations (13) and (15), the angular velocity can be determined as $$\hat{\omega}(t) = L_\omega^{-1} \dot{\hat{e}}_\omega(t) \text{ as } t \to \infty \quad (16)$$

An angular velocity estimation error $$\tilde{\omega}(t) \in \mathbb{R}^3 \overset{\Delta}{=} [\tilde{\omega}_1(t), \tilde{\omega}_2(t), \tilde{\omega}_3(t)]^T$$

is defined as $\tilde{\omega}_i(t) = \omega_i(t) - \hat{\omega}_i(t)$, $\forall i = \{1, 2, 3\}$. The angular velocity estimator given by Equation (14) is asymptotically stable; thus, the angular velocity estimation error $\|\tilde{\omega}(t)\| \to 0$ as $t \to \infty$.

Step II:

Structure Estimation: A reduced order observer for $\theta(t)$ is designed as $$\begin{bmatrix} \hat{y}_3 \\ \hat{u}_1 \\ \hat{u}_2 \end{bmatrix} = \begin{bmatrix} \bar{y}_3 \\ \bar{u}_1 \\ \bar{u}_2 \end{bmatrix} + \Gamma \begin{bmatrix} \frac{-b_3(y_1^2 + y_2^2)}{2} \\ y_1 \\ y_2 \end{bmatrix} \quad (17)$$

where the state vector $[\bar{y}_3 \ \bar{u}_1 \ \bar{u}_2]^T$ is updated using the following update law $$\begin{bmatrix} \dot{\bar{y}}_3 \\ \dot{\bar{u}}_1 \\ \dot{\bar{u}}_2 \end{bmatrix} = \underbrace{\begin{bmatrix} \hat{y}_3^2 b_3 + (y_2 \hat{\omega}_1 - y_1 \hat{\omega}_2) \hat{y}_3 \\ \hat{y}_3 b_3 \hat{u}_1 + (y_2 \hat{\omega}_1 - y_1 \hat{\omega}_2) \hat{u}_1 + q(\hat{b}_1) \hat{u}_1 \\ \hat{y}_3 b_3 \hat{u}_2 + (y_2 \hat{\omega}_1 - y_1 \hat{\omega}_2) \hat{u}_2 + q(\hat{b}_2) \hat{u}_2 \end{bmatrix}}_{g(\hat{\theta}, \hat{\omega}, y_1, y_2, b_3)} - $$

$$\Gamma J^T \underbrace{\left( \begin{bmatrix} -y_1 b_3 & 1 & 0 \\ -y_2 b_3 & 0 & 1 \end{bmatrix} \begin{bmatrix} \hat{y}_3 \\ \hat{u}_1 \\ \hat{u}_2 \end{bmatrix} + \begin{bmatrix} -y_1 y_2 \hat{\omega}_1 + (1 + y_1^2) \hat{\omega}_2 - y_2 \hat{\omega}_3 \\ -(1 + y_2^2) \hat{\omega}_1 + y_1 y_2 \hat{\omega}_2 + y_1 \hat{\omega}_3 \end{bmatrix} \right)}_{\psi(y, \hat{\omega})} + $$

$$\Gamma \begin{bmatrix} \frac{b_3(y_1^2 + y_2^2)}{2} \\ 0 \\ 0 \end{bmatrix}. \quad (18)$$

In Equation (18), $\Gamma \in \mathbb{R}^+$, $\hat{\omega}_i(t)$ are given by Equation (16), and $J(y, b_3)$ is defined in Equation (9). Differentiating Equation (11) and using Equations (9), (10), (17) and (18) yields the following closed-loop observer error dynamics $$\begin{bmatrix} \dot{\tilde{\theta}}_1 \\ \dot{\tilde{\theta}}_2 \\ \dot{\tilde{\theta}}_3 \end{bmatrix} = \begin{bmatrix} (y_3 + \hat{y}_3) b_3 \tilde{\theta}_1 + (y_2 \omega_1 - y_1 \omega_2) \tilde{\theta}_1 + (y_2 \tilde{\omega}_1 - y_1 \tilde{\omega}_2) \hat{y}_3 \\ y_3 b_3 \tilde{\theta}_2 + b_3 \hat{u}_1 \tilde{\theta}_1 + (y_2 \hat{\omega}_1 - y_1 \hat{\omega}_2) \tilde{\theta}_2 + (y_2 \tilde{\omega}_1 - y_1 \tilde{\omega}_2) \hat{u}_1 + q(b_1) \tilde{\theta}_2 + \lambda_1 (b_1 - \hat{b}_1) \hat{u}_1 \\ y_3 b_3 \tilde{\theta}_3 + b_3 \hat{u}_2 \tilde{\theta}_1 + (y_2 \hat{\omega}_1 - y_1 \hat{\omega}_2) \tilde{\theta}_3 + (y_2 \tilde{\omega}_1 - y_1 \tilde{\omega}_2) \hat{u}_2 + q(b_2) \tilde{\theta}_3 + \lambda_2 (b_2 - \hat{b}_2) \hat{u}_2 \end{bmatrix} +$$

$$\Gamma J^T \left( \begin{bmatrix} -y_1 b_3 & 1 & 0 \\ -y_2 b_3 & 0 & 1 \end{bmatrix} \begin{bmatrix} \hat{y}_3 \\ \hat{u}_1 \\ \hat{u}_2 \end{bmatrix} + \begin{bmatrix} -y_1 y_2 \hat{\omega}_1 + (1 + y_1^2) \hat{\omega}_2 - y_2 \hat{\omega}_3 \\ -(1 + y_2^2) \hat{\omega}_1 + y_1 y_2 \hat{\omega}_2 + y_1 \hat{\omega}_3 \end{bmatrix} - \begin{bmatrix} \dot{y}_1 \\ \dot{y}_2 \end{bmatrix} \right).$$

Using the output dynamics from Equation (9), the error dynamics can be rewritten as $$\dot{\tilde{\theta}} = g(\theta,\omega,y_1,y_2,b_3) - g(\hat{\theta},\hat{\omega},y_1,y_2,b_3) - \Gamma J^T(J\tilde{\theta} + \psi(y,\tilde{\omega})).$$

Using Assumption 2, the following relationship can be developed $$g(\theta,\omega,y_1,y_2,b_3) - g(\hat{\theta}\hat{\omega},y_1,y_2,b_3) = \Lambda\tilde{\theta} + \alpha(y_1,y_2,\hat{\theta}\tilde{\omega}) \quad (19)$$

where $$\Lambda(t) = \begin{bmatrix} (y_3 + \hat{y}_3)b_3 + (y_2\omega_1 - y_1\omega_2) & 0 & 0 \\ b_3\hat{u}_1 + \frac{\lambda_1\hat{u}_1^2}{y_3\hat{y}_3} & y_3 b_3 + q(b_1) + (y_2\hat{\omega}_1 - y_1\hat{\omega}_2) + \frac{\lambda_1\hat{u}_1}{y_3} & 0 \\ b_3\hat{u}_2 + \frac{\lambda_2\hat{u}_2^2}{y_3\hat{y}_3} & 0 & y_3 b_3 + q(b_2) + (y_2\hat{\omega}_1 - y_1\hat{\omega}_2) + \frac{\lambda_2\hat{u}_2}{y_3} \end{bmatrix}, \quad (20)$$

such that $\sup_t \|\Lambda(t)\| \leq \rho$, and $$\alpha(y_1, y_2, \hat{\theta}, \tilde{\omega}) = \begin{bmatrix} (y_2\tilde{\omega}_1 - y_1\tilde{\omega}_2)\hat{y}_3 \\ (y_2\tilde{\omega}_1 - y_1\tilde{\omega}_2)\hat{u}_1 \\ (y_2\tilde{\omega}_1 - y_1\tilde{\omega}_2)\hat{u}_2 \end{bmatrix}. \quad (21)$$

Using Equation (19) the error dynamics can be written as $$\dot{\tilde{\theta}} = \Lambda\tilde{\theta} - \Gamma J^T J\tilde{\theta} - \Gamma J^T \Psi(y,\tilde{\omega}) + \alpha(y_1,y_2,\hat{\theta}\tilde{\omega}). \quad (22)$$

The results from the angular velocity estimator in Section IV-A1 prove that $\tilde{\omega}_1, \tilde{\omega}_2, \tilde{\omega}_3 \to 0$ therefore, Equation (21) can be used to conclude that $\Psi(\cdot) \to 0$ and $\alpha(\cdot) \to 0$ as $t \to \infty$.

Theorem 1:

If Assumptions 1-4 are satisfied, the reduced order observer in Equations (17) and (18) asymptotically estimates $\theta(t)$ in the sense that $\|\tilde{\theta}(t)\| \to 0$ as $t \to \infty$.

Proof:

The stability of the error system in Equation (22) can be proved using a converse Lyapunov theorem. Consider the nominal system $$\dot{\tilde{\theta}} = f(\tilde{\theta}) = -\Gamma J^T J \tilde{\theta}. \quad (23)$$

The error system in Equation (23) is globally exponentially stable if Assumption 3 is satisfied. Hence, $\tilde{\theta}(t)$ satisfies the inequality $\|\tilde{\theta}(t)\| \leq \|\tilde{\theta}(t_0)\|\alpha_1 e^{-\alpha_2(t-t_0)}$, where $\alpha_1, \alpha_2 \in \mathbb{R}^+$, and $\alpha_2$ is directly proportional to $\Gamma$ and inversely proportional to $\delta$. Consider a set $D = \{\tilde{\theta}(t) \in \mathbb{R}^3 \| \|\tilde{\theta}(t)\| < \infty\}$. Using a converse Lyapunov theorem there exists a function $V:[0,\infty) \times D \to \mathbb{R}$ that satisfies $$c_1 \|\tilde{\theta}(t)\|^2 \leq V(t, \tilde{\theta}) \leq c_2 \|\tilde{\theta}(t)\|^2,$$

$$\frac{\partial V}{\partial t} + \frac{\partial V}{\partial \tilde{\theta}}(-\Gamma J^T J\tilde{\theta}) \leq -c_3 \|\tilde{\theta}(t)\|^2, \quad (24)$$

$$\left\|\frac{\partial V}{\partial \tilde{\theta}}\right\| \leq c_4 \|\tilde{\theta}(t)\|$$

for some positive constants $c_1, c_2, c_3, c_4$. Using $V(t, \tilde{\theta})$ as a Lyapunov function candidate for the perturbed system in Equation (22), the derivative of $V(t,\tilde{\theta})$ along the trajectories of Equation (22) is given by $$\dot{V}(t, \tilde{\theta}) = \frac{\partial V}{\partial t} + \frac{\partial V}{\partial \tilde{\theta}}(-\Gamma J^T J\tilde{\theta}) + \frac{\partial V}{\partial \tilde{\theta}}((\Lambda)\tilde{\theta}) + \frac{\partial V}{\partial \tilde{\theta}}(-\Gamma J^T \Psi(y, \tilde{\omega}) + \alpha(y_1, y_2, \hat{\theta}, \tilde{\omega})).$$

Using the bounds in Equation (24) the following inequality is developed $$\dot{V}(t,\tilde{\theta}) \leq -(c_3 - c_4\rho)\|\tilde{\theta}\|^2 + c_4 d\|\tilde{\theta}\| \quad (25)$$

where $\rho$ is an upper bound on (20) and $d(t) = \|\Gamma\|\|J^T\|\|\Psi(y,\tilde{\omega})\| + \|\alpha(y_1,y_2,\hat{\theta}\tilde{\omega})\|$ where $d(t) \to 0$ as $t \to \infty$. The estimates of $c_3$ and $c_4$ are given by $$c_3 = \frac{1}{2},$$

$$c_4 = \frac{2\alpha_1}{(\alpha_2 - L)}\left[1 - e^{-\frac{(\alpha_2 - L)\ln(2\alpha_1^2)}{2\alpha_2}}\right]$$

where $L \in \mathbb{R}^+$ is an upper bound on the norm of Jacobian matrix $$\frac{\partial f(\tilde{\theta})}{\partial \tilde{\theta}},$$

where $f(\tilde{\theta})$ is defined in Equation (23). Since $\alpha_2$ is directly proportional to the gain $\Gamma$, the inequality $$c_3 - c_4\rho = \frac{1}{2} - \frac{2\alpha_1\rho}{(\alpha_2 - L)}\left[1 - e^{-\frac{(\alpha_2 - L)\ln(2\alpha_1^2)}{2\alpha_2}}\right] > 0$$

can be achieved by choosing the gain $\Gamma$ sufficiently large. Using Equations (24) and (25), the following bound is obtained $$\|\tilde{\theta}(t)\| \leq \sqrt{\frac{c_2}{c_1}} e^{\frac{c_4}{2c_1}} \|\tilde{\theta}(t_0)\| e^{-\beta(t-t_0)} + \frac{c_4}{2c_1} e^{\frac{c_4}{2c_1}} \int_0^t e^{-\beta(t-\tau)} d(\tau)d\tau \quad (26)$$

where a constant convergence rate $\beta > 0$ can be increased by increasing $c_3$. From Equation (26), $\|\tilde{\theta}(t)\| \in L_\infty$, thus $\tilde{\theta}_1(t), \tilde{\theta}_2(t), \tilde{\theta}_3(t) \in L_\infty$. Since $\tilde{\theta}_1(t), \tilde{\theta}_2(t), \tilde{\theta}_3(t) \in L_\infty$, and the fact that $\theta_1(t), \theta_2(t), \theta_3(t) \in L_\infty$ can be used to conclude that $\hat{\theta}_1(t), \hat{\theta}_2(t), \hat{\theta}_3(t) \in L_\infty$. Using the result from Section IV-A1 that $\|\tilde{\omega}(t)\| \to 0$ as $t \to \infty$, the functions $\|\Psi(y,\tilde{\omega})\|, \|\alpha(y_1, y_2, \hat{\theta}, \tilde{\omega})\| \to 0$ as $t \to \infty$. Hence, $d(t) \to 0$ as $t \to \infty$ and $d(t) \in LL_\infty$. Since $d(t) \to 0$ as $t \to \infty$ and $d(t) \in LL_\infty$, by the Lebesgue dominated convergence theorem $$\lim_{t\to\infty}\int_0^t e^{-\beta(t-\tau)}d(\tau)d\tau = \int_0^t e^{-\beta\sigma}\lim_{t\to\infty}d(\tau-\sigma)d\sigma$$
$$= \frac{\lim_{t\to\infty}d(t)}{\beta}$$
$$= 0.$$

It can be shown that $\|\tilde{\theta}(t)\|\to 0$ as $t\to\infty$. Hence, the reduced order estimator in Equations (17) and (18) identifies the structure of observed feature points and unknown camera motion asymptotically. Since $y_3(t)$, $u_1(t)$, and $u_2(t)$ can be estimated, the motion parameters $b_1(t)$ and $b_2(t)$ can be recovered based on the definition of $u(t)$.

As described above, a reduced order observer is developed for the estimation of the structure (i.e. range to the target and Euclidean coordinates of the feature points) of a stationary target with respect to a moving camera, along with two unknown time-varying linear velocities and the angular velocity. The angular velocity is estimated using homography relationships between two camera views. The observer requires the image coordinates of the points, a single linear camera velocity, and the corresponding linear camera acceleration in any one of the three camera coordinate axes. Under a physically motivated PE condition, asymptotic convergence of the observer is guaranteed. Having at least some partial motion knowledge and a similar observability condition to the given PE condition are likely necessary in future solutions to the SaM problem. However, future efforts could potentially eliminate the need for any model of the vehicle trajectory (even if uncertain as in this result) and eliminate the need for an acceleration measurement.

Figure 1B:
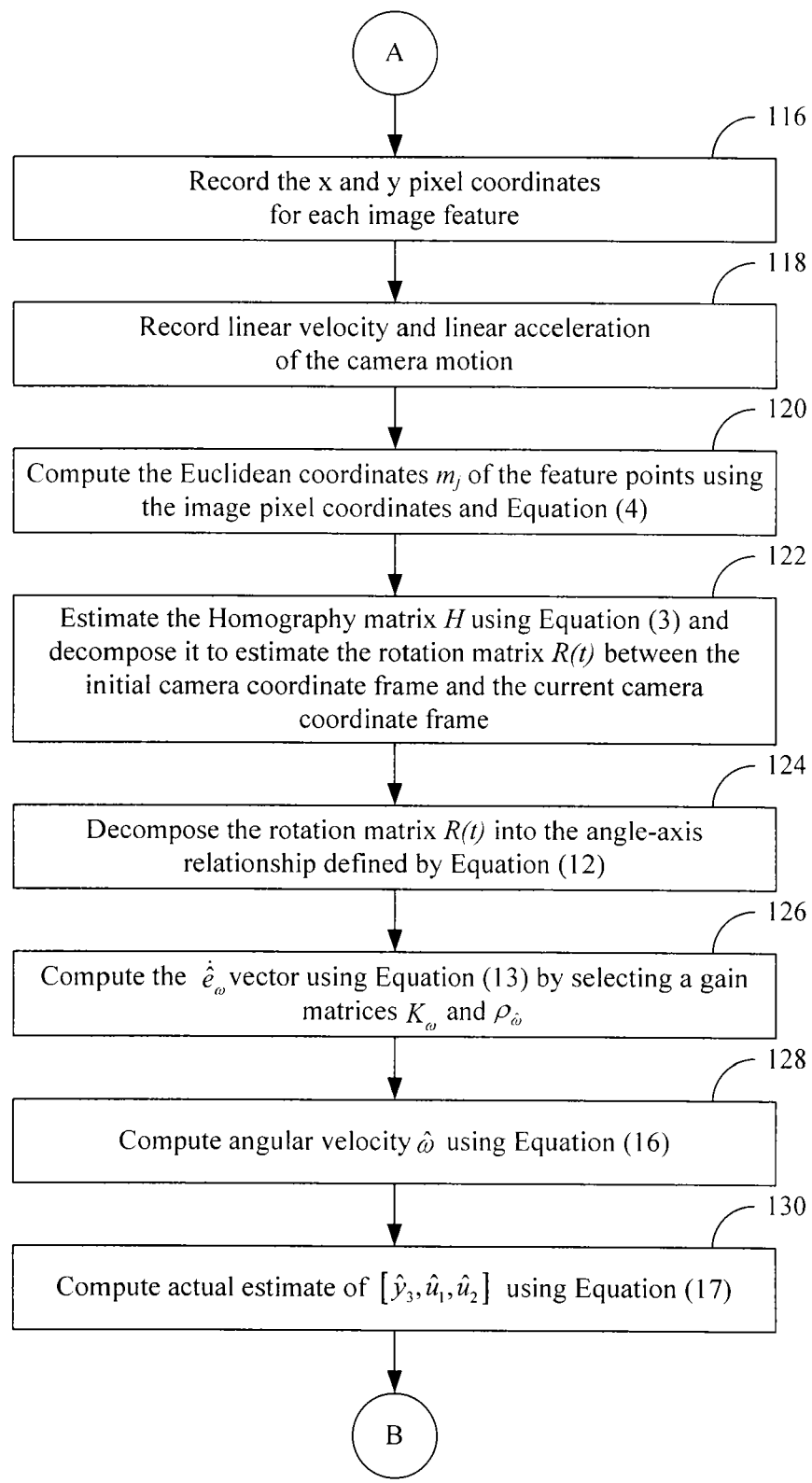
Figure 1C:
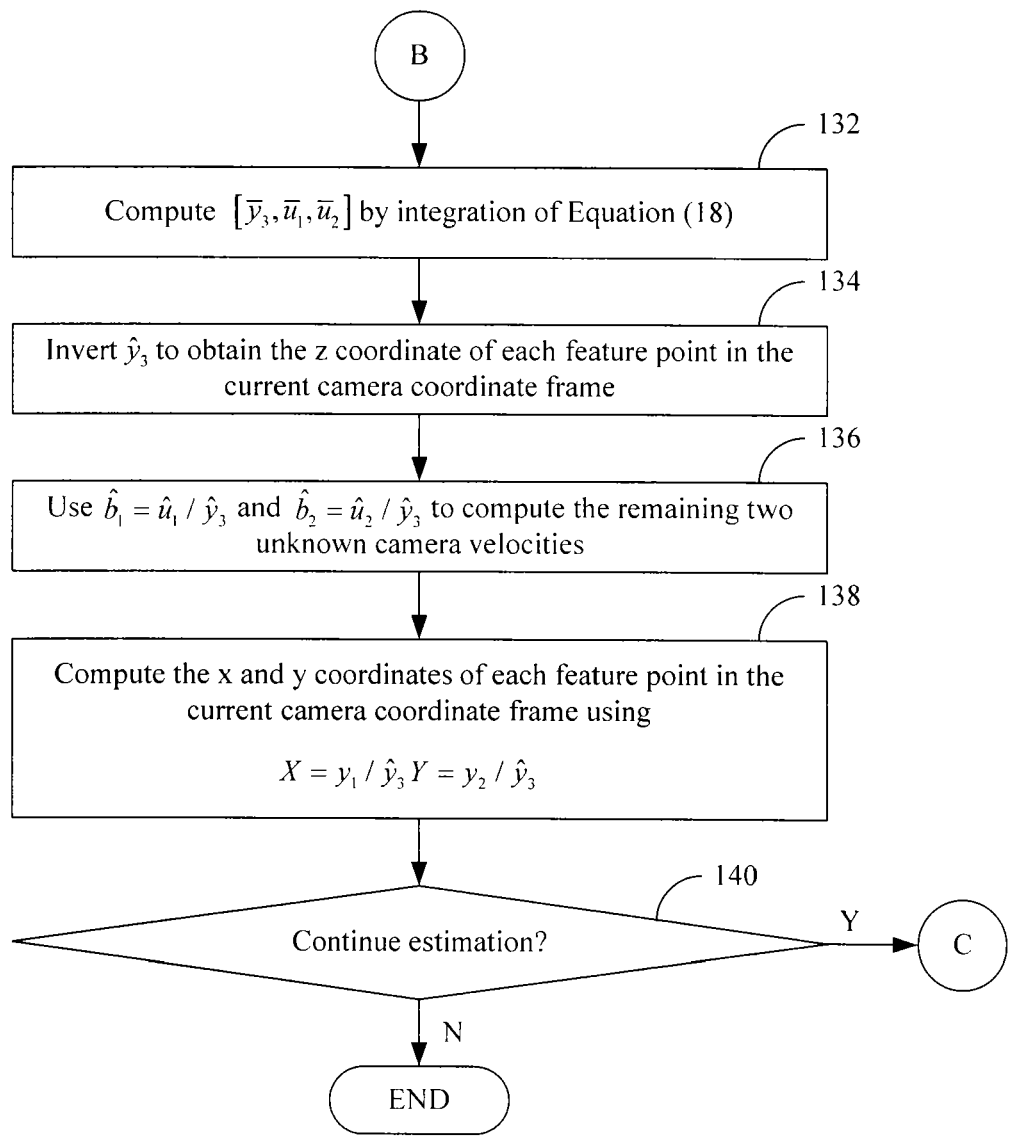

FIGS. 1A-1C illustrate an example method for estimating the structure and motion of a stationary object consistent with the above discussion. Beginning with block 100, the rotation error vector $\hat{e}_\omega$ and the state vector $[\bar{y}_3, \bar{u}_1, \bar{u}_2]$ are initialized. As can be appreciated from the foregoing discussion, the rotation error vector $\hat{e}_\omega$ is a representation of the rotation between a previous (initial) image or frame and a current image or frame, $\bar{y}_3$ is an auxiliary signal for the inverse depth of the feature point $(\hat{y}_3)$, $\bar{u}_1$, is an estimate of the camera linear velocity in the x direction multiplied by the inverse of the depth, and $\bar{u}_2$ is an estimate of the camera linear velocity in the y direction multiplied by the inverse of the depth. Substantially any initial values (e.g., random numbers) can be used to initialize those vectors, although the closer the selected values are to the actual values that are being estimated, the faster convergence will be attained. In some embodiments, the values that are selected depend upon the underlying conditions in which the estimation is being performed.

Figure 2:
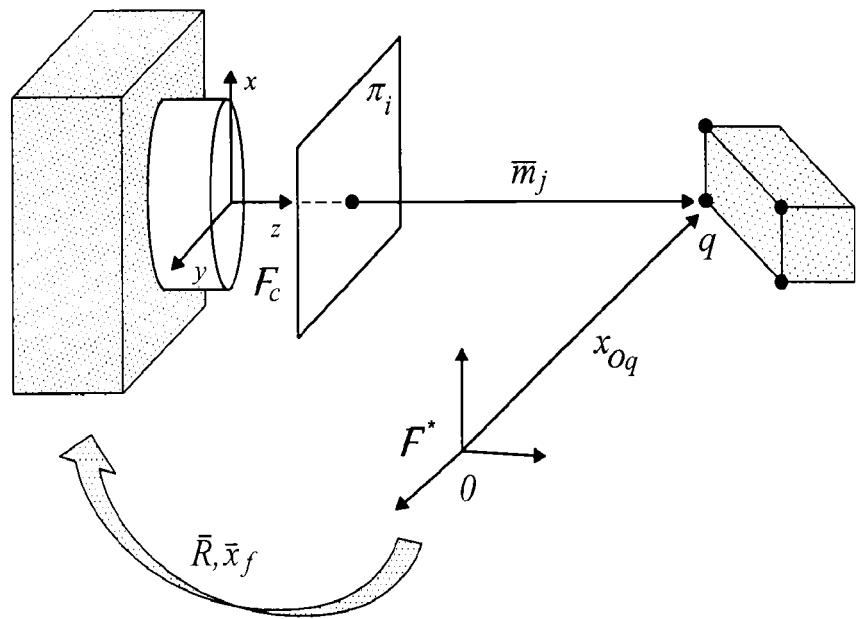
FIG. 2 is a schematic drawing of a moving camera directed toward an object in a scene.

Once the rotation error vector and the state vector have been initialized, an initial image of an object can be captured using a moving camera, as indicated in block 102. FIG. 2 schematically illustrates such image capture with a camera. By way of example, the object is a stationary terrestrial object and the camera is mounted to a moving object, such as an unmanned aerial vehicle (UAV). Once the initial image is captured, feature points of the object within the image are extracted, as indicated in block 104. By way of example, four coplanar feature points are extracted or eight non-coplanar feature points are extracted. In some embodiments, coplanar points can be identified using image segmentation techniques. With reference to block 106, the x and y pixel coordinates of each image feature point are recorded and, with reference to block 108, the linear velocity and linear acceleration of the camera motion at the time of image capture, which are measured by sensors (e.g., accelerometers) associated with the camera, are recorded. In some embodiments, the linear velocity and acceleration along the z direction are recorded. In alternative embodiments, however, the linear velocity and acceleration along the x or y direction can be recorded. At this point, the Euclidean coordinates $m_j$ of the feature points are computed and $m_j$ is designated as $m_j^*$, as indicated in block 110. As can be appreciated from the foregoing discussion, $m_j$ is a transformed image point in the camera frame that is defined by Equation (4). That equation indicates that $m_j$ can be determined from a pixel location $p_j$ and a camera calibration matrix A.

Referring next to block 112, the next image of the object is captured using the moving camera and, as before, feature points within the image are extracted (block 114), the x and y pixel coordinates of each image feature point is recorded (block 116 of FIG. 1B), and the linear velocity and linear acceleration of the camera motion at the time of image capture is recorded (block 118). At this point, the Euclidean coordinates $m_j$ of the feature points are computed using the image pixel coordinates and Equation (4), as indicated in block 120.

Turning to block 122, the homography matrix H is estimated using Equation (3) and it is decomposed to estimate the rotation matrix R(t) between the initial camera coordinate frame and the current camera coordinate frame. As can be appreciated from the foregoing discussion, the homography matrix H is a geometry transformation between the current image or frame and the previous image or frame that encodes the rotation and scaled translation information, and R(t) is a representation of the rotation between the current image or frame and the previous image or frame as a function of time. In Equation (3), H can be determined when $m_j^*$ and the depth ratio $\alpha_j$ (the ratio of the depth to a point in the current image or frame and the depth to the same point in the previous image or frame) are known Next, the rotation matrix R(t) is decomposed into the angle-axis relationship defined by Equation (12), as indicated in block 124. This transforms R(t) from a 3×3 matrix representation to an angle-axis representation. At this point, $e_\omega$ is known (from Equation (12)) and the $\hat{e}_\omega$ vector can be computed using Equation (14) by selecting gain matrices $K_\omega$ and $\rho_\omega$, as indicated in block 126. The $\dot{e}_\omega$ vector, which is an estimate of the derivative of $e_\omega$, is determined to filter out noise created by the camera. The angular velocity $\omega$ of the camera can then be computed using Equation (16), as indicated in block 128. In that equation, $L_\omega$ is an invertible Jacobian matrix.

With reference to block 130, an actual estimate for the state vector $[\hat{y}_3, \hat{u}_1, \hat{u}_2]$ is computed using Equation (17) and, with reference to block 132 of FIG. 1C, $[\bar{y}_3, \bar{u}_1, \bar{u}_2]$ are computed by integration of Equation (18). As can be appreciated from the foregoing discussion, Equations (17) and (18) are coupled. The initialized $[\bar{y}_3, \bar{u}_1, \bar{u}_2]$ can be used in Equation (16) along with the second term (which is obtained from the image sensor) in that equation to compute $[\hat{y}_3, \hat{u}_1, \hat{u}_2]$ for the initial frame. Then those values can be input into Equation (18) to obtain the derivative of $[\bar{y}_3, \bar{u}_1, \bar{u}_2]$ for the initial frame. Next, $[\bar{y}_3, \bar{u}_1, \bar{u}_2]$ can then be input back into Equation (17) to obtain $[\hat{y}_3, \hat{u}_1, \hat{u}_2]$ for the current frame. As indicated in block 134, $\hat{y}_3$ can then be inverted to obtain the z coordinate of each feature point in the current camera coordinate frame. The relations $\hat{b}_1 = \hat{u}_1/\hat{y}_3$ and $\hat{b}_2 = \hat{u}_2/\hat{y}_3$ can then be used to compute the remaining two unknown camera velocities (e.g., the linear velocities in the x and y directions), as indicated in block 136. At this point, the x and y coordinates of each feature point in the current camera coordinate frame can be computed using $X = y_1/\hat{y}_3, Y = y_2/\hat{y}_3$, as indicated in block 138. With that information, the relative positions, and motion, of the feature points at the time the current image or frame was captured are known. As indicated in decision block 140, if the estimation is to continue and a further image is to be captured, flow returns to block 112 of FIG. 1A.

The above-described methods are useful in estimating the structure and motion of stationary objects, but cannot be used for moving objects. Described below are methods for estimating the 3D structure (with proper scale) of objects, whether they are stationary or moving, viewed by a moving camera. In contrast to traditionally developed batch solutions for this problem, a nonlinear unknown input observer strategy is used where the object's velocity is considered as an unknown input to the perspective dynamical system. The estimator is exponentially stable and hence provides robustness against modeling uncertainties and measurement noise from the camera. In some embodiments, the methods implement a first-causal, observer-based structure estimation algorithm for a moving camera viewing a moving object with unknown time-varying object velocities.

As noted above, recovering the structure of a stationary object viewed by a moving camera is called structure from motion (SfM). The fundamental concept behind SfM algorithms is triangulation. Since the object being observed is stationary, two rays projected onto consecutive images and the camera baseline form a triangle. If the object is not stationary, however, then the projections of the object will be from different locations in the fixed inertial frame. Therefore, triangulation is not feasible and standard SfM techniques cannot be used to recover the structure of a moving object using a moving camera. The following discussion presents a result for the case when the viewed object is in motion. This problem can be described as a structure and motion from motion (SaMfM) estimation.

Batch algorithms use an algebraic relationship between 3D coordinates of points in the camera coordinate frame and corresponding two-dimensional (2D) projections on the image frame collected over multiple images to estimate the structure. Therefore, batch algorithms are not useful in real-time control algorithms. For visual servo control or video-based surveillance tasks, online structure estimation algorithms are beneficial. The objective of an unknown input observer (UIO) for SaMfM is to estimate the structure of moving objects from a stream of images described using a continuous dynamical model, instead of algebraic relationships and geometric constraints. As described below, a UIO provides an online algorithm that relaxes the constant object linear velocity assumption and does not require the time-varying object velocities to be approximated by a basis.

Several UIO algorithms are present in literature for estimating the state when an exogenous time-varying unknown input is present in the system. The contribution here is to provide a causal algorithm for estimating the structure of a moving object using a moving camera with relaxed assumptions on the object's motion. In the relative rigid body motion dynamics, the moving object's linear velocity can be viewed as an exogenous time-varying disturbance and is considered as an unknown input. Given the unique UIO method, no assumptions are made on the minimum number of tracked feature points or minimum number of views required to estimate the structure. In fact, the developed approach only requires single tracked feature point and camera velocity information.

A UIO algorithm for SaMfM will now be presented. Specifically, objectives are defined, a pinhole camera model is introduced and a differential equation formulation of the problem is provided. A UIO is then designed to estimate the unknown structure given measurements from camera images and camera velocities. A procedure for selecting observer gains is developed using a linear matrix inequality (LMI) formulation. Finally, numerical simulations demonstrate the effectiveness of the algorithm.

The objective of SaMfM is to recover the structure (i.e., Euclidean coordinates with a scaling factor) and motion (i.e., velocities) of moving objects observed by a moving camera, when all camera velocities are assumed to be known. An observer is presented below that estimates the structure of a moving object with respect to an intrinsically calibrated moving camera. At least one feature point on the object is assumed to be tracked in each image frame, and camera velocities are recorded using sensors such as an Inertial Measurement Unit (IMU).

Consider the scenario depicted in FIG. 2 where a moving camera views moving point objects (such as feature points on a rigid object). In FIG. 2, an inertial reference frame is denoted by $F^*$. The reference frame $F^*$ can be attached to the camera at the location corresponding to an initial point in time t where the object is in the camera field of view (FOV), i.e., $F^*$ is identical to $F_c(t_0)$. After the initial time, a reference frame $F_c$ attached to a pinhole camera undergoes some rotation $\bar{R}(t) \in SO(3)$ and translation $\bar{x}_f(t) \in \mathbb{R}^3$ away from $F^*$.

The Euclidean coordinates $\bar{m}(t) \in \mathbb{R}^3$ of a point observed by a camera expressed in the camera frame $F_c$ and the respective normalized Euclidean coordinates $m(t) \in \mathbb{R}^3$ are defined as $$\bar{m}(t) \triangleq [\, X(t),\ Y(t),\ Z(t) \,]^T, \tag{27}$$

$$m(t) \triangleq \left[\, \frac{X(t)}{Z(t)},\ \frac{Y(t)}{Z(t)},\ 1 \,\right]^T. \tag{28}$$

Consider a closed and bounded set $Y \subset \mathbb{R}^3$. To facilitate the subsequent development, the state vector $x(t) = [x_1(t), x_2(t), x_3(t)]^T \in Y$ is constructed from Equation (28) as $$x = \left[\, \frac{X}{Z},\ \frac{Y}{Z},\ \frac{1}{Z} \,\right]^T. \tag{29}$$

Using projective geometry, the normalized Euclidean coordinates m(t) can be related to the pixel coordinates in the image space as $$q = A_c m \tag{30}$$

where $q(t) = [\bar{u}(t)\ \bar{v}(t)\ 1]^T$ is a vector of the image-space feature point coordinates $\bar{u}(t), \bar{v}(t) \in \mathbb{R}$ defined on the closed and bounded set $I \subset \mathbb{R}^3$, and $A_c \in \mathbb{R}^{3 \times 3}$ is a constant, known, invertible intrinsic camera calibration matrix. Since $A_c$ is known, the expression in Equation (30) can be used to recover m(t), which can be used to partially reconstruct the state x(t) so that the first two components of x(t) can be determined. The states defined in Equation (29) contain unknown structure information about the object. The object structure can be determined by estimating the Euclidean coordinates of multiple feature points on the object; however, without loss of generality the following UIO development is applied to a single feature point, with Euclidean coordinates that can be recovered from the state x(t) in Equation (29).

Assumption 5:

The relative Euclidean distance Z(t) between the camera and the feature points observed on the object is upper and lower bounded by some known positive constants (i.e., the object remains some finite distance away from the camera). Therefore, the definition in Equation (29) can be used to assume that $$\bar{x}_3 \geq x_3(t) \geq \underline{x}_3 \tag{31}$$

where $\bar{x}_3$, $\underline{x}_3 \in \mathbb{R}$ denote known positive bounding constants. Likewise, since the image coordinates are constrained (i.e., the object is assumed to remain within the camera field of view (FOV)), the relationships in Equations (28)-(30) along with the fact that $A_c$ is invertible can be used to conclude that $$\bar{x}_1 \geq |x_1(t)| \geq \underline{x}_1, \bar{x}_2 \geq |x_2(t)| \geq \underline{x}_2$$

where $\bar{x}_1, \bar{x}_2, \underline{x}_1, \underline{x}_2 \in \mathbb{R}$ denote known positive bounding constants.

Consider a moving camera viewing a moving point q. As shown in FIG. 2, the point q can be expressed in the coordinate system $F_c$ as $$\bar{m} = \bar{x}_f + \bar{R}x_{oq} \tag{32}$$

where $x_{oq}$ is a vector from the origin of coordinate system $F^*$ to the point q expressed in the coordinate system $F^*$. Differentiating Equation (32), the relative motion of q as observed in the camera coordinate system can be expressed by the following kinematics $$\dot{\bar{m}} = [\omega]_x \bar{m} + v_r \tag{33}$$

where $\bar{m}(t)$ is defined in Equation (27), $[\omega]_x \in \mathbb{R}^{3 \times 3}$ denotes a skew symmetric matrix formed from the angular velocity vector of the camera $\omega(t) = [\omega_1 \ \omega_2 \ \omega_3]^T \in W$, and $v_r(t)$ represents the relative velocity of the camera with respect to the moving point, defined as $$v_r \triangleq v_c - \bar{R}\bar{v}_p. \tag{34}$$

In Equation (34), $v_c(t) = [v_{cx} \ v_{cy} \ v_{cz}]^T \in V_c \subset \mathbb{R}^3$ denotes the camera velocity expressed in camera reference frame $F_c$, and $$\bar{R}\bar{v}_p(t) \triangleq v_p(t) = [v_{px} \ v_{py} \ v_{pz}]^T \in V_p \subset \mathbb{R}^3$$

denotes the velocity of the moving point q expressed in camera reference frame $F_c$, and $$\bar{v}_p(t) \triangleq [\bar{v}_{px} \ \bar{v}_{py} \ \bar{v}_{pz}]^T \in \bar{V}_p \subset \mathbb{R}^3$$

denotes the velocity of the moving point in the inertial reference frame $F^*$. The sets $W$, $V_c$, and $\bar{V}_p$ are closed and bounded sets such that $W \subset \mathbb{R}^3$, $V_c \subset \mathbb{R}^3$, and $\bar{V}_p \subset \mathbb{R}^3$. Let the linear and angular camera velocities be denoted by $u = [v_c \ \omega]^T$.

The states defined in Equation (29) contain unknown structure information of the object. To recover the 3D structure, the state x(t) should be estimated. Using Equations (29) and (33), the dynamics of the state vector x(t) are expressed as $$\dot{x}_1 = \Omega_1 + (v_{cx} - x_1 v_{cz})x_3 - v_{px}x_3 + x_1 v_{pz}x_3,$$

$$\dot{x}_2 = \Omega_2 + (v_{cy} - x_2 v_{cz})x_3 - v_{py}x_3 + x_2 v_{pz}x_3,$$

$$\dot{x}_3 = -v_{cz}x_3^2 - (x_2\omega_1 - x_1\omega_2)x_3 + v_{pz}x_3^2,$$

$$y = [x_1 x_2]^T. \tag{35}$$

where $\Omega_1(u,y)$, $\Omega_2(u,y) \in \mathbb{R}$ are defined as $$\Omega_1(u,y) \triangleq -x_1 x_2 \omega_1 + \omega_2 + x_1^2 \omega_2 - x_2 \omega_3,$$

$$\Omega_2(u,y) \triangleq -\omega_1 - x_2^2 \omega_1 + x_1 x_2 \omega_2 + x_1 \omega_3,$$

Assumption 6:

The camera velocities $\omega(t)$, and $v_c(t)$, the object velocity $v_p(t)$, and the feature points y(t) are assumed to be upper bounded by constants.

Remark 5:

The dynamics in Equation (35) are not observable if: a) the camera is stationary, i.e., $v_c(t)=0,\omega(t)=0$, or b) the camera moves along the ray projected by the feature point on the image, i.e., $(v_{cx}-v_{px}-x_1(v_{cz}-v_{pz}))=(v_{cy}-v_{py}-x_2(v_{cz}-v_{pz}))=0$.

In the discussion that follows, a UIO is developed for a class of nonlinear systems. Additionally, conditions on the moving object's velocity are stated so that the model in Equation (35) satisfies the requirements of the UIO. The system in Equation (35) can be represented in the form $$\dot{x} = f(x,u) + g(y,u) + Dd$$

$$y = Cx \tag{36}$$

where $x(t) \in \mathbb{R}^3$ is a state of the system, $u(t) \in \mathbb{R}^6$ is a measurable control input, $d(t) \in \mathbb{R}$ is an unmeasurable disturbance input, $y(t) \in \mathbb{R}^2$ is output of the system, the functions $f: \mathbb{R}^3 \times \mathbb{R}^6 \to \mathbb{R}^3$ and $g: \mathbb{R}^2 \times \mathbb{R}^6 \to \mathbb{R}^3$ are given by $$f(x,u) = \begin{bmatrix} (v_{cx} - x_1 v_{cz})x_3 \\ (v_{cy} - x_2 v_{cz})x_3 \\ -x_3^2 v_{cz} - x_2 x_3 \omega_1 + x_1 x_3 \omega_2 \end{bmatrix},$$

$$g(y,u) = \begin{bmatrix} -x_1 x_2 \omega_1 + (1+x_1^2)\omega_2 - x_2 \omega_3 \\ -(1+x_2^2)\omega_1 + x_1 x_2 \omega_2 + x_1 \omega_3 \\ 0 \end{bmatrix},$$

$$C = \begin{bmatrix} 1 & 0 & 0 \\ 0 & 1 & 0 \end{bmatrix}$$

is full row rank and $D \in \mathbb{R}^{3 \times 1}$ is full column rank. The function $f(x,u)$ satisfies following Lipschitz conditions $$\|f(x,u) - f(\hat{x},u)\| \leq \gamma_1 \|x - \hat{x}\| \tag{37}$$

$$\|f(x,u) - f(\hat{x},u) - A(x-\hat{x})\| \leq (\gamma_1 + \gamma_2)\|x - \hat{x}\| \tag{38}$$

where $\gamma_1, \gamma_2 \in \mathbb{R}^+$, $A \in \mathbb{R}^{3 \times 3}$, and $\hat{x}(t) \in \mathbb{R}^3$ is an estimate of the unknown state x(t). Larger $\gamma_1$ would mean that the UIO is stable even in the presence of fast moving nonlinear dynamics in $f(x,u)$, i.e., for larger camera velocities.

The UIO objective is to design an exponentially converging state observer to estimate x(t) in the presence of an unknown input d(t). To quantify this objective an estimation error is defined as $$e(t) \triangleq \hat{x}(t) - x(t). \tag{39}$$

Based on Equation (39) and the subsequent stability analysis, the UIO for the system in Equation (36) is designed as $$\dot{z} = Nz + Ly + M\bar{f}(\hat{x},u) + Mg(y,u)$$

$$\hat{x} = z - Ey \tag{40}$$

where $\bar{f}(x,u) = f(x,u) - Ax$, $z(t) \in \mathbb{R}^3$ is an auxiliary signal, the matrices $N \in \mathbb{R}^{3 \times 3}$, $L \in \mathbb{R}^{3 \times 2}$, $E \in \mathbb{R}^{3 \times 2}$, $M \in \mathbb{R}^{3 \times 3}$ are designed as $$M = I_3 + EC$$

$$N = MA - KC$$

$$L = K(I_2 + CE) - MAE \qquad (41)$$

where E is subsequently designed and $K \in \mathbb{R}^{3 \times 2}$ is a gain matrix which satisfies the inequality $$Q = N^T P + PN + (\gamma_1 + \gamma_2)^2 PMM^T P + 2I_3 2I_3 < 0_{3 \times 3} \qquad (42)$$

where $P \in \mathbb{R}^{3 \times 3}$ is a positive definite, symmetric matrix. Using Equation (41), the equality $$NM + LC - MA = 0_{3 \times 3} \qquad (43)$$

is satisfied, where $0_{3 \times 3}$ denotes a zero matrix of the dimensions $3 \times 3$. E is selected as $$E = F + YG \qquad (44)$$

where $Y \in \mathbb{R}^{3 \times 2}$ can be chosen arbitrarily, and F and G are given by $$F = -D(CD)^\dagger, G = (I_2 - (CD)(CD)^\dagger).$$

From the definitions of E, F, and G, $ECD = -D$ and the following equality is satisfied:

$$MD = (I_3 + EC)D = 0_{3 \times 1}. \qquad (45)$$

Since $\text{rank}(CD) = 1$, the generalized pseudo inverse of the matrix CD exists and is given by $$(CD)^\dagger = ((CD)^T(CD))^{-1}(CD)^T.$$

Substituting Equation (40) into Equation (39), taking the time derivative of the result, and using Equations (36) and (40) yields $$\dot{e} = Nz + Ly + M\bar{f}(\hat{x}, u) - (I_3 + EC)Ax - (I_3 + EC)\bar{f}(x,u) - (I_3 + EC)Dd. \qquad (46)$$

Using Equations (39) and (41), and the conditions in Equations (43) and (45) the error system in Equation (46) can be written as $$\dot{e} = Ne + M(\bar{f}(\hat{x}, u) - \bar{f}(x, u)) \qquad (47)$$

Theorem 2:

The nonlinear unknown input observer in Equation (40) is exponentially stable if the assumptions 1 and 2, and condition in Equation (42) is satisfied.

Proof:

Consider a positive definite (PD), radially unbounded Lyapunov candidate function $V(e): \mathbb{R}^n \to \mathbb{R}$ defined as $$V = e^T P e. \qquad (48)$$

which satisfies $$\lambda_{min}(P) \|e\|^2 \leq V \leq \lambda_{max}(P) \|e\|^2 \qquad (49)$$

where $\lambda_{min}(\cap)$ and $\lambda_{max}(\bullet)$ are the minimum and maximum eigenvalues of the matrix P. Taking the time derivative of Equation (48) along the trajectories of Equation (47) yields $$\dot{V} = e^T(N^T P + PN)e + 2e^T PM(\bar{f}(\hat{x},u) - \bar{f}(x,u))$$

$$\dot{V} \leq e^T(N^T P + PN)e + 2\|e^T PM\| \|\bar{f}(\hat{x},u) - \bar{f}(x,u) - A(\hat{x}-x)\|$$

$$\dot{V} \leq e^T(N^T P + PN)e + 2\|e^T PM\|\gamma_1\|e\| + 2\|e^T PM\|\gamma_2\|e\|.$$

Using the norm inequality $$2\gamma_i \|e^T PM\| \|e\| \leq \gamma_i^2 \|e^T PM\|^2 + \|e\|^2, \forall i = \{1, 2\},$$

the upper bound on $\dot{V}$ is given by $$\dot{V} \leq e^T(N^T P + PN)e + (\gamma_1^2 + \gamma_2^2)e^T PMM^T Pe + 2e^T e$$

$$\dot{V} \leq e^T(N^T P + PN + (\gamma_1^2 + \gamma_2^2)PMM^T P + 2I_3)e$$

$$\dot{V} \leq e^T Q e. \qquad (50)$$

If the condition in Equation (42) is satisfied, then $\dot{V} < 0$. Using Equations (48)-(50) the upper bounds for V(e) and V(e) can be developed as $$V(e) \leq (e(0)) \exp(-\xi t)$$

where $$\xi = \frac{\lambda_{max}(Q)}{\lambda_{min}(P)}$$

and $$\|e(t)\| \leq \zeta \|e(0)\| \exp(-\xi t)$$

where $$\zeta = \frac{\lambda_{max}(P)}{\lambda_{min}(P)}.$$

Remark 6:

Model uncertainties can be represented by an additive disturbance term $d_1(t) \in \mathbb{R}^3$ in Equation (36). Also, if the number of outputs, p, is less than the number of unknown disturbance inputs, q, then $q_1 < p$ number of unknown inputs can be represented by d(t) and remaining $q - q_1$ can be represented by an additive disturbance $D_1 d_1(t) \in \mathbb{R}^{q - q_1}$. In each of the above mentioned cases, the estimation error will be uniformly ultimately bounded.

Conditions will next be developed for which an exact estimation of the 3D position of the feature point can be found. Conditions for choosing matrix A in Equation (41) are stated and conditions on the object's trajectories are developed so that an exact estimation can be obtained. The UIO can be used even if the conditions on the object's velocity are not satisfied. In this special case, the state x(t) can only be estimated up to a bounded estimation error, which can be reduced using an optimization procedure.

Next, conditions for selecting A are provided based on the observer existence conditions. Sufficient conditions for the existence of the UIO in Equation (40) can be summarized as: (MA, C) is observable, rank(CD) = rank(D) = q, MA - KC is Hurwitz, and Equation (42) holds. Since rank(CD) = rank(D) = 1, subsequent development indicates that observability of the pair (MA,C) is equivalent to the following rank condition $$\text{rank}\begin{bmatrix} \lambda I_3 - A & D \\ C & 0_{2 \times 1} \end{bmatrix} = 4, \forall \lambda \in C. \qquad (51)$$

Thus, A in Equation (41) should be selected so that Equation (51) is satisfied and (MA,C) is observable. The condition in Equation (51) facilitates the selection of A based on the system matrices and hence circumvents the computation of M for checking the observability of (MA,C). Another criteria on the selection of A is to minimize the Lipschitz constant in Equation (37).

Some assumptions on the motion of the camera and the viewed object are required to satisfy the constraints on disturbance inputs in Equation (36). In this section, two specific scenarios are discussed.

EXAMPLE 1

The camera is undergoing arbitrary purely translational motion, i.e., the angular velocities of the camera are zero and the object is moving along a straight line with time-varying unknown velocities. For this case, choices of $\bar{R}(t)$ and $\bar{v}_p(t)$ in Equation (34) become $\bar{R}=I_3$, and $\bar{v}_p(t)=[d_1(t)\ 0\ 0]^T$, or $\bar{v}_p(t)=[0\ d_1(t)\ 0]^T$, or $\bar{v}_p(t)=[0\ 0\ d_1(t)]^T$, or $\bar{v}_p(t)=[d_1(t)\ d_1(t)\ 0]^T$, etc., where $d_1(t) \in \mathbb{R}$ is the unknown time-varying object velocity. Physically, these object velocities would mean the object is moving along straight lines or moving along a circle.

EXAMPLE 2

A downward looking camera is undergoing arbitrary translational motion along with the angular velocity along the Z-direction (an axis pointing downwards). The object is moving on a ground plane (i.e., X-Y plane) with arbitrary time-varying velocities. In this case, the rotation matrix $\bar{R}(t)$ is given by $$\bar{R} = \begin{bmatrix} \cos(\theta(t)) & \sin(\theta(t)) & 0 \\ -\sin(\theta(t)) & \cos(\theta(t)) & 0 \\ 0 & 0 & 1 \end{bmatrix} = \begin{bmatrix} \bar{R}_s & 0_{2\times 1} \\ 0_{1\times 2} & 1 \end{bmatrix}$$

where $\theta(t) \in [-2\pi, 2\pi)$ is the rotation angle between the current camera coordinate frame and inertial coordinate frame, and $\bar{R}_s(t) \in \mathbb{R}^{2\times 2}$ represents the upper left $2\times 2$ block of the $\bar{R}(t)$. The object velocity in the inertial frame is represented as $\bar{v}_p(t)=[\bar{d}_1(t)\ \bar{d}_2(t)\ 0]^T$, where $\bar{d}_1(t), \bar{d}_2(t) \in \mathbb{R}$. The camera angular velocity is such that $$\bar{R}v_p = v_p \quad (52)$$

where $v_{p1}(t)=[\bar{d}_3(t)\ 0\ 0]^T$ or $v_{p2}(t)=[0\ \bar{d}_4(t)\ 0]^T$, and $\bar{d}_3(t), \bar{d}_4(t) \in \mathbb{R}$ are unknown time-varying quantities. The equality in Equation (52) can be achieved if $\bar{R}_s[\bar{d}_1(t)\ \bar{d}_2(t)]^T = v_{p3}$, where $v_{p3}(t)=[\bar{d}_3(t)\ 0]^T$ or $v_{p3}(t)=[0\ \bar{d}_4(t)]^T$. For example, consider an object undergoing a circular motion with unknown and possibly time-varying radius in the X-Y plane with unknown time-varying velocities observed by a camera undergoing an arbitrary linear motion in the X-Y-Z plane and circular motion along the downward looking Z-direction.

Next, the condition in Equation (42) is reformulated as an LMI feasibility problem. The matrices P, K and Y should be selected such that the sufficient condition for the observer error stability in Equation (42) is satisfied. Substituting N and M from Equation (41) into Equation (42) yields $$(MA-KC)^T P + P(MA-KC) + 2I_3 + (\gamma_1^2+\gamma_2^2)P(I_3+EC)(I_3+EC)^T P < 0_{3\times 3}. \quad (53)$$

After using Equation (44), the inequality in Equation (53) can be expressed as $$A^T(I_3+FC)^T P + P(I_3+FC)A + A^T C^T G^T P_Y^T + P_Y GCA - C^T P_K^T - P_K C + 2I_3 + (\gamma_1^2+\gamma_2^2)(P+PFC+P_YGC)(P+PFC+P_YGC)^T < 0_{3\times 3} \quad (54)$$

where $P_Y = PY$ and $P_K = PK$. For the observer synthesis, the matrices Y, K and $P > 0$ should be computed such that the matrix inequality in Equation (42) is satisfied. Since $P > 0$, exists, and Y and K can be computed using $Y = P^{-1} P_Y$, and $K = P^{-1} P_K$. Using Schur's complement, the inequality in Equation (54) can be transformed into the matrix inequality $$\begin{bmatrix} P_1 & \beta R \\ \beta R^T & -I_3 \end{bmatrix} < 0_{6\times 6} \quad (55)$$

where $$P_1 = A^T(I_3+FC)^T P + P(I_3+FC)A + A^T C^T G^T P_Y^T + P_Y GCA - C^T P_K^T - P_K C + 2I_3, R = P + PFC + P_Y GC,$$

$\beta = \sqrt{\gamma_1^2 + \gamma_2^2}$.

The matrix inequality in Equation (55) is an LMI in variables P, $P_Y$, and $P_K$. The LMI feasibility problem can be solved using standard LMI algorithms and is a problem of finding P, $P_Y$, and $P_K$ such that $\beta$ is maximized. Maximizing $\beta$ is equivalent to maximizing $\gamma$, which means the observer can be designed for nonlinear functions with a larger Lipschitz constant. If the LMI in Equation (55) is feasible, then a solution to Equation (42) exists. Hence, the LMI feasibility problem is a sufficient condition for the stability of the observer.

Remark 7:

In Equation (40), the gain K is multiplied by the measurement y(t). To reduce the effects of noise, the elements of gain K should not be large. Since $K = P^{-1} P_K$, the minimum eigenvalue of P should be maximized and the maximum eigenvalue of $P_K$ should be minimized. This can be achieved via a multi-objective optimization problem with the objective function as maximize $\delta \lambda_{min}(P) - (1-\delta)\lambda_{max}(P_K)$ subject to the LMI in Equation (55), where $\lambda \in [0,1]$. In the presence of model uncertainties or disturbance inputs as stated in Remark 2, another optimization objective can be to choose gain K such that the $LL_2$ gain from the disturbance input to the estimation error is minimized.

Two simulations are performed for a moving camera observing an object moving in a plane. For the first simulation, camera velocities are given by $v_c(t)=[2\ 1\ 0.5\ \cos(t/2)]^T$ m/s, and $\omega(t)=[0\ 0\ 1]^T$ rad/s. The object velocity is selected such that $v_p(t)=[0.5\ \sin(t)\ 0\ 0]^T$ m/s. The camera calibration matrix is given by $$A_c = \begin{bmatrix} 720 & 0 & 320 \\ 0 & 720 & 240 \\ 0 & 0 & 1 \end{bmatrix}.$$

Measurement noise with 20 dB SNR is added to the image pixel coordinates and the camera velocities using awgn( ) command in Simulink. Matrices A, C, and D are $$A = \begin{bmatrix} 0 & -1 & 2 \\ 1 & 0 & 1 \\ 0 & 0 & 0 \end{bmatrix}, C = \begin{bmatrix} 1 & 0 & 0 \\ 0 & 1 & 0 \end{bmatrix}, D = \begin{bmatrix} 1 \\ 0 \\ 0 \end{bmatrix}.$$

The matrix Y and the gain matrix K are computed using the LMI feasibility command 'feasp' in Matlab and are given by $$K = \begin{bmatrix} 0.8278 & 0 \\ 0 & 0.8278 \\ -1.5374 & 0 \end{bmatrix}, Y = \begin{bmatrix} 0 & 0 \\ 0 & -1 \\ 0 & -1.5374 \end{bmatrix}.$$

Figure 3:
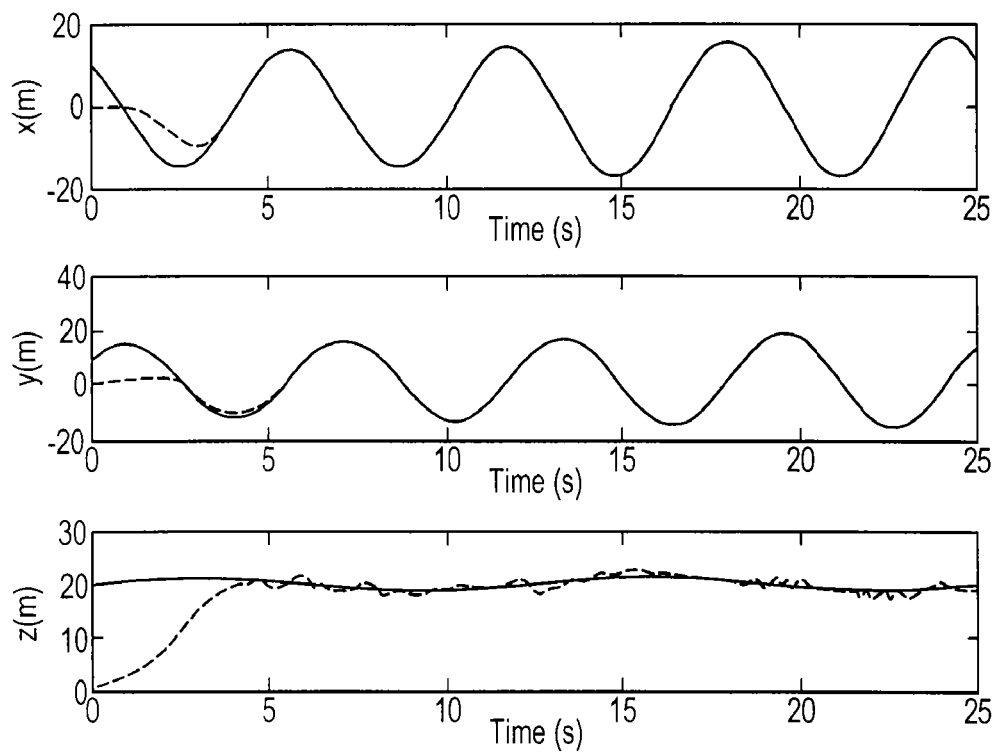
FIG. 3 are graphs that compare the actual and estimated X, Y, and Z positions of a moving object with respect to a moving camera expressed in the camera frame for a first simulation case.

FIG. 3 shows comparison of the actual and estimated X, Y and Z coordinates of the object in the camera coordinate frame.

In the second simulation, camera velocities are given by $v_c(t)=[2\ 1+0.02t\ -0.01]^T$ m/s, $\omega(t)=[0\ 0\ 0.1]^T$ rad/s. The object motion is set to a circular motion with unknown radius and velocities. Measurement noise with 20 dB SNR is added to the image pixel coordinates and the camera velocities using awgn( ) command in Simulink. Matrices A, C and D are:

$$A = \begin{bmatrix} 0 & -0.1 & 2 \\ 0.1 & 0 & 1 \\ 0 & 0 & 0 \end{bmatrix}, C = \begin{bmatrix} 1 & 0 & 0 \\ 0 & 1 & 0 \end{bmatrix}, D = \begin{bmatrix} 0 \\ 1 \\ 0 \end{bmatrix}.$$

The matrix Y and the gain matrix K are computed using the LMI feasibility command ' feasp' in Matlab and are given by $$K = \begin{bmatrix} 1.0667 & 0 \\ 0 & 1.0667 \\ 0 & 0.056 \end{bmatrix}, Y = \begin{bmatrix} -1 & 0 \\ 0 & 0 \\ -0.5598 & 0 \end{bmatrix}.$$

Figure 4:
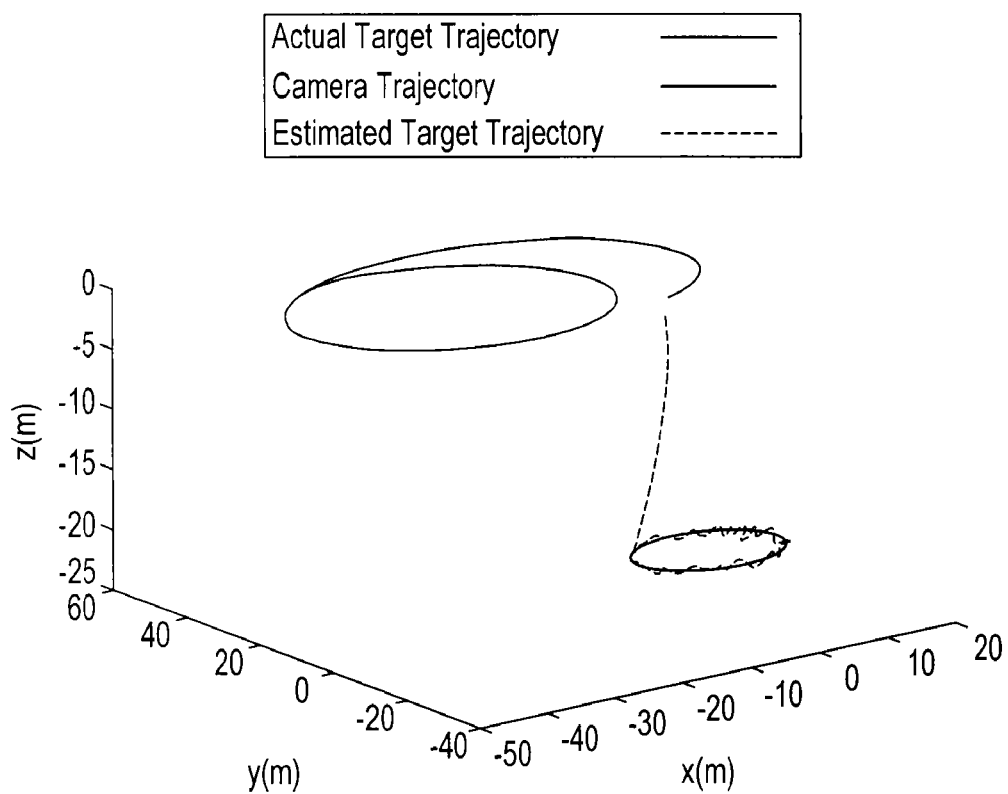
FIG. 4 is a graph that illustrates a camera trajectory, object trajectory, and comparison of the object trajectory with the estimated X, Y, and Z positions of a moving object in the inertial frame for a second simulation case.
Figure 5:
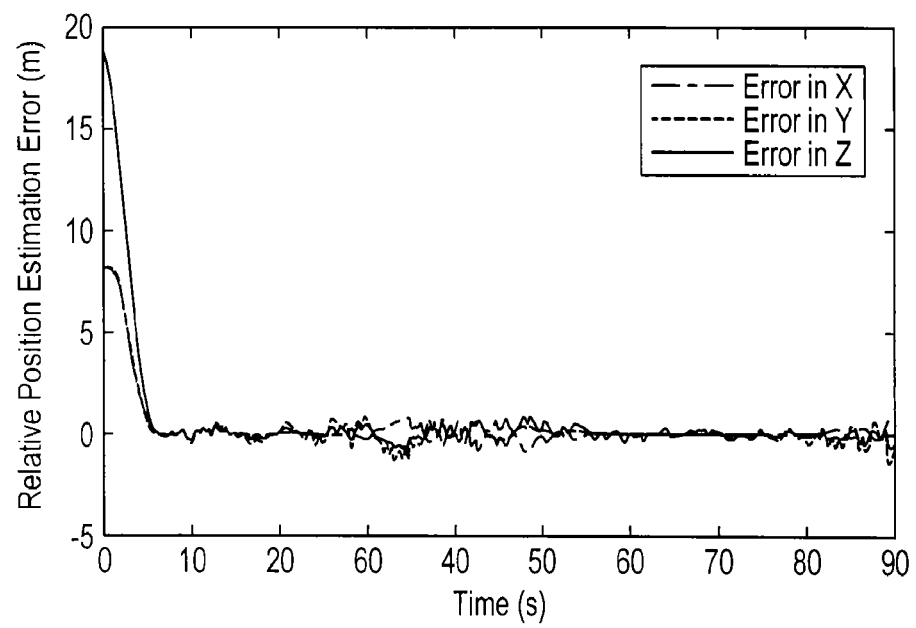
FIG. 5 is a graph of the error in the relative range estimation of the moving object in the camera reference frame for the second simulation case.

FIG. 4 shows the comparison of actual and estimated X, Y, and Z coordinates of the object in the Inertial coordinate frame in the presence of measurement noise. FIG. 5 shows the structure estimation error. From the two results in two simulations, it can be seen that the observer is insensitive to the disturbance input.

Experiments are conducted on PUMA 560 serial manipulator to test the performance of the proposed estimator. Results of one of the test cases are presented below. A mvBlueFox-120a USB camera is rigidly attached to the end-effector of PUMA. A two-link robot mounted on the same platform as the PUMA is used as a moving object. The PUMA is controlled using a workstation to generate camera motion, and the camera linear and angular velocities are computed using the joint encoders and forward velocity kinematics of the PUMA. The data from the camera is recorded on the PUMA workstation computer at 25 frames per second for further processing and is time synchronized with the camera images. Two-link robot was controlled using another workstation which was time-synchronized with the PUMA workstation for ground truth verification. The video data recorded from the camera is post-processed to track a feature point on second link of the two-link robot using KLT feature point tracker. The image processing code is implemented in Visual C++ 2008 using OpenCV library. Since the PUMA and two-link robot was mounted on the same table, a precise location of the base of both the robots is computed and forward kinematics is used to compute the position of the camera and the feature point on a link of the two-link robot. Hence, a 3D distance between camera mounted on the PUMA and feature point on the two-link robot can be computed precisely and is used as a ground truth for testing the performance of the proposed estimator.

A downward looking camera attached to PUMA is moved with randomly chosen linear and angular velocities in X-Y-Z directions, and the two-link robot is commanded certain velocities in X-Y plane. The observer in Equations (40)-(41) is implemented to estimate the relative 3D location of a moving feature point on the two-link robot in the camera reference frame. The observer parameters are selected as $$A = \begin{bmatrix} 0 & -0.05 & 0 \\ 0.05 & 0 & -0.3 \\ 0 & 0 & 0 \end{bmatrix}, C = \begin{bmatrix} 1 & 0 & 0 \\ 0 & 1 & 0 \end{bmatrix}, D = \begin{bmatrix} 1 \\ 0 \\ 0 \end{bmatrix}. \quad (56)$$

The matrix Y and the gain matrix K are computed using the LMI feasibility command feasp in Matlab to solve LMI in Equation (55) using the matrices in Equation (56) and are given by $$K = \begin{bmatrix} 1.2204 & 0 \\ 0 & 1.2204 \\ 0.3731 & 0.056 \end{bmatrix}, Y = \begin{bmatrix} 0 & 0 \\ 0 & -1 \\ 0 & 7.4618 \end{bmatrix}.$$

Figure 6:
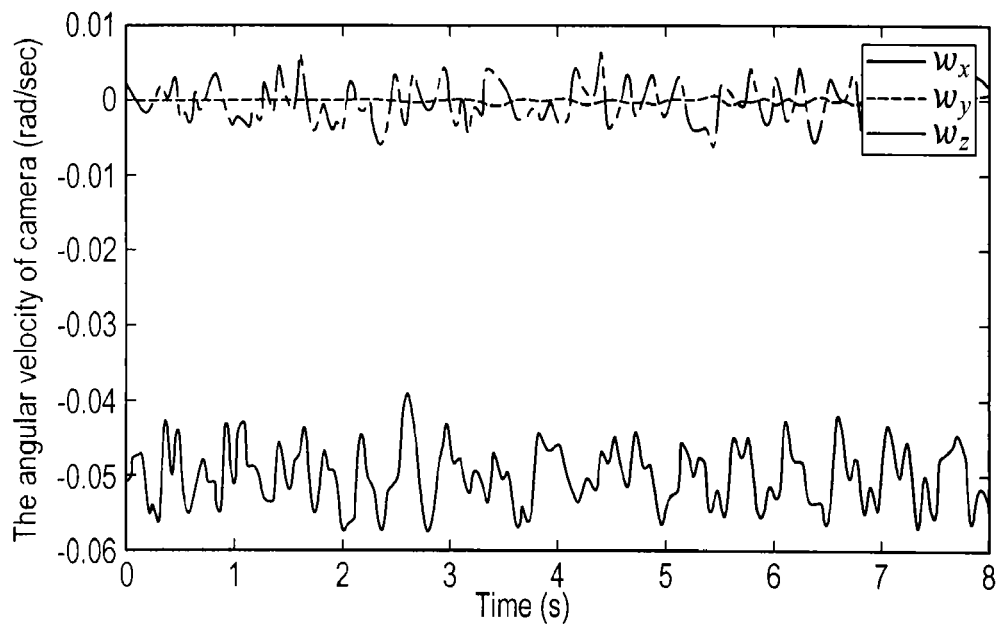
FIG. 6 is a graph of a set of camera angular velocities.
Figure 7:
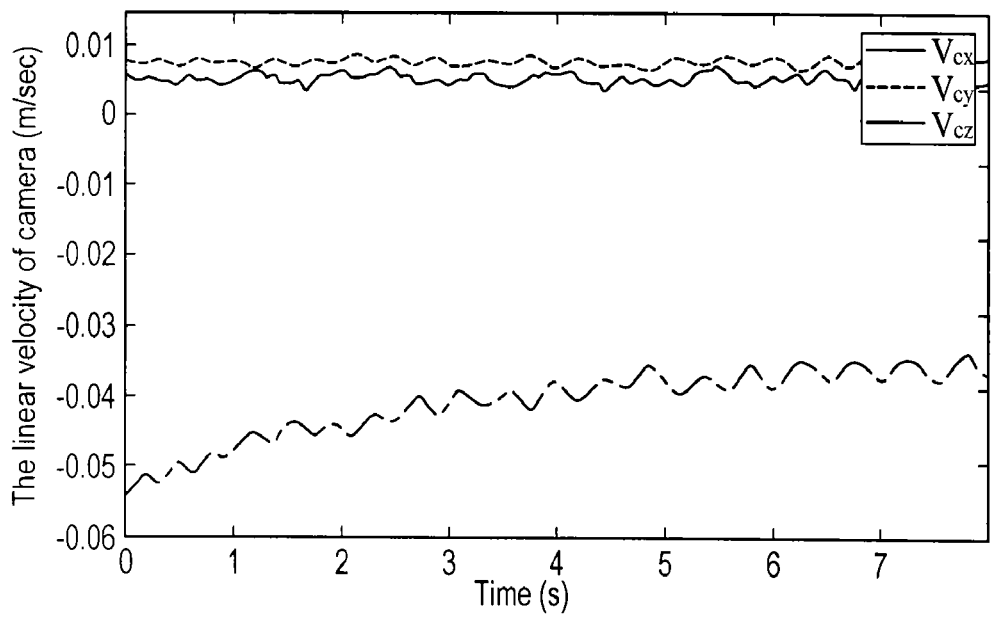
FIG. 7 is a graph of a set of camera linear velocities.
Figure 8:
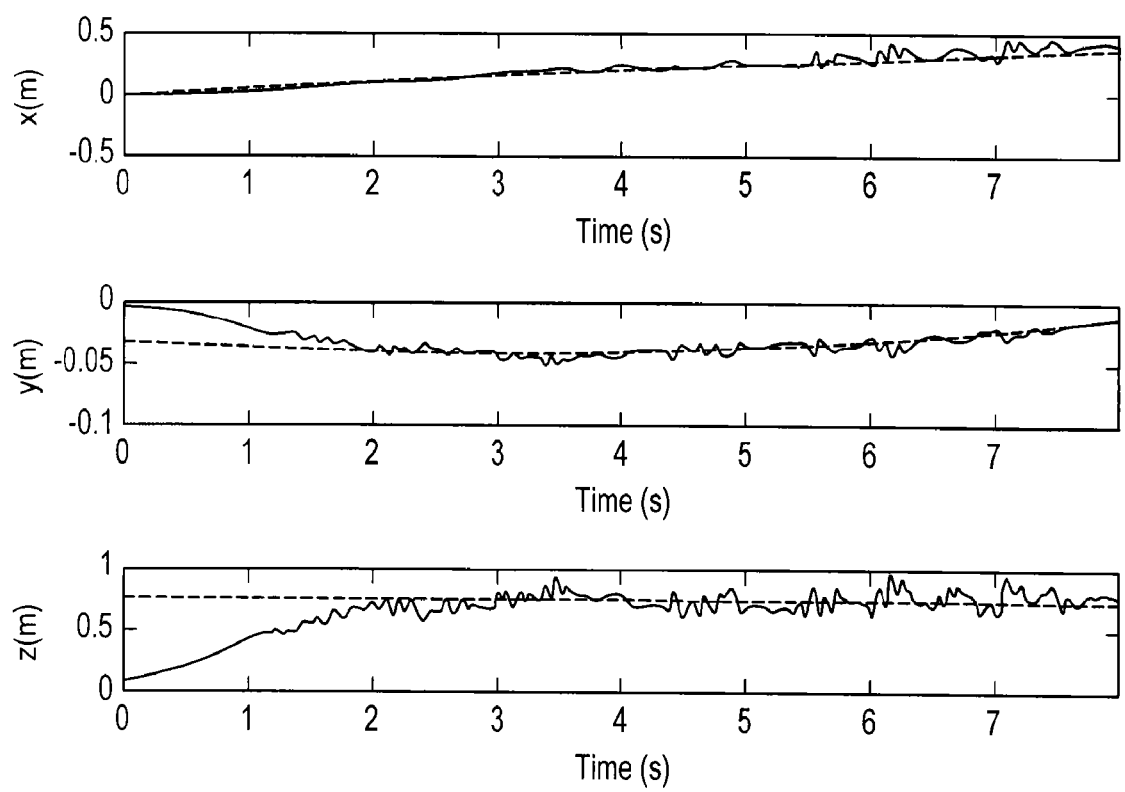
FIG. 8 is a graph that compares the estimated and ground truth 3D position of the moving object measured in the moving camera frame.

FIGS. 6 and 7 shows the camera linear and angular velocities. The comparison of the estimated relative 3D position of the moving point in the camera reference frame and ground truth 3D position is shown in FIG. 8.

Some preliminary studies of the structure (3D location) of a moving object using a moving camera with known camera velocities has been presented. More testing and experimental verification of the proposed algorithm is required to verify the performance of the algorithm in various real-life situations.

Figure 9A:
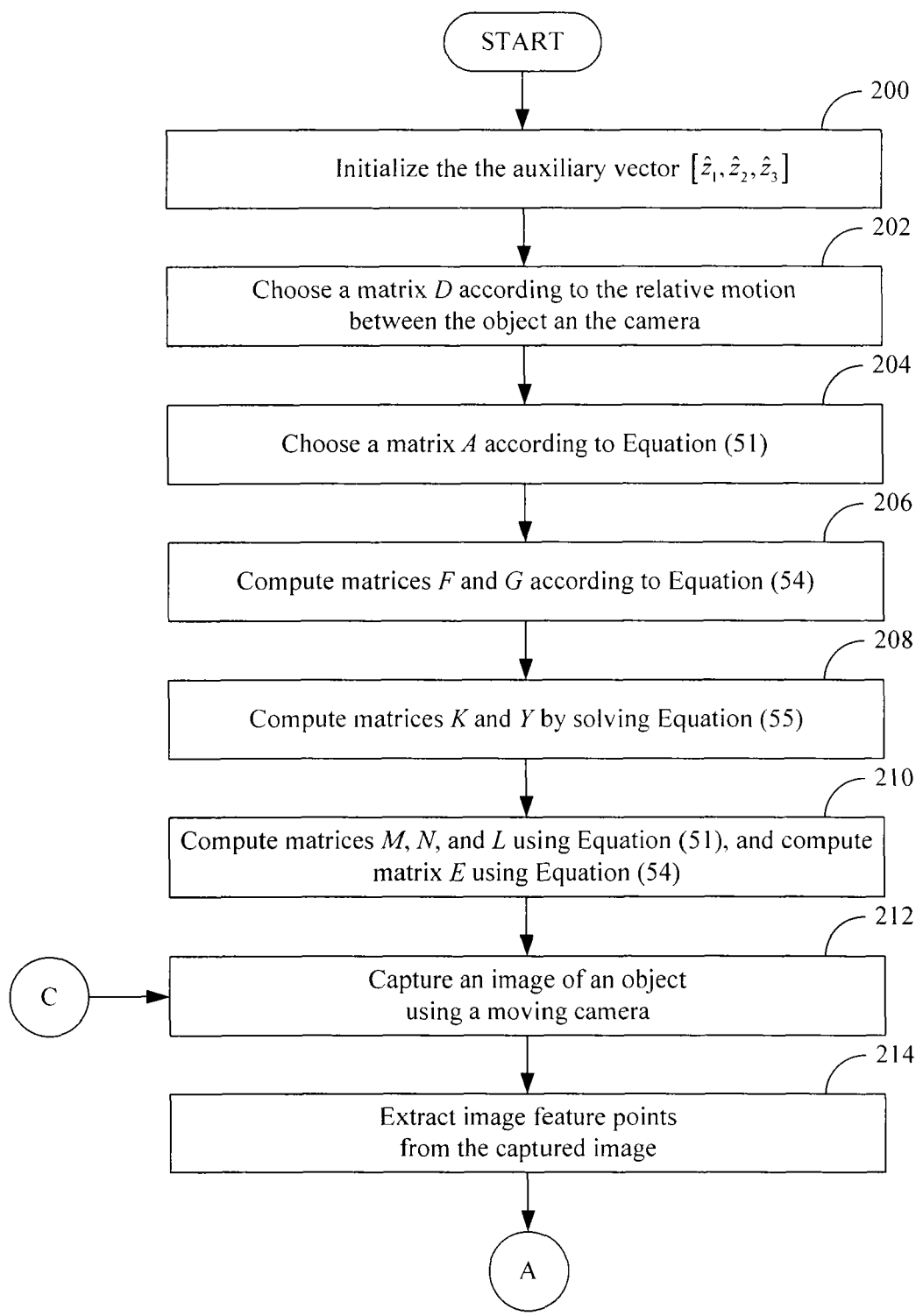
FIGS. 9A and 9B comprise a flow diagram of a second embodiment of a method for estimating the structure and motion of a stationary or moving object.
Figure 9B:
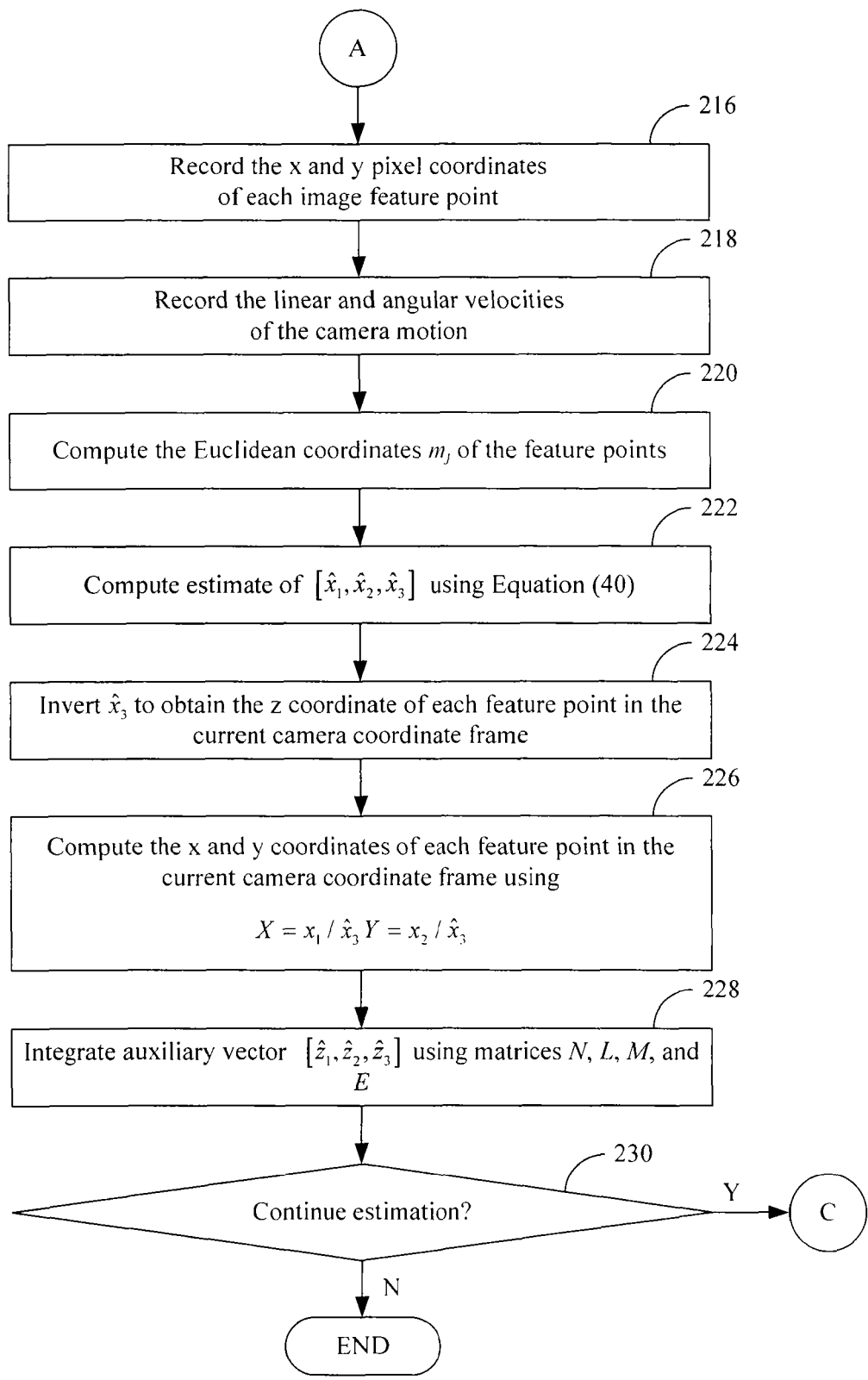

FIGS. 9A and 9B illustrate an example method for estimating the structure and motion of a stationary or moving object consistent with the above discussion. In this method, the angular and linear velocities of the camera are known. Beginning with block 200, the auxiliary vector $[\hat{z}_1, \hat{z}_2, \hat{z}_3]$ is initialized. The auxiliary vector is a transformed version of the state vector $[\hat{x}_1, \hat{x}_2, \hat{x}_3]$. As with the previous method, substantially any initial values (e.g., random numbers) can be used to initialize the vector, although the closer the selected values are to the actual values that are being estimated, the faster convergence will be attained.

Once the auxiliary vector has been initialized, a matrix D is chosen based on what is believed to be the relative motion between the object and the camera, as indicated in block 202. Matrix D is a representation of that relative motion. Next, with reference to block 204, a matrix A is chosen according to Equation (51). Matrix A is the state matrix and represents camera motion, i.e., the linear and angular velocities of the camera. Notably, the method would work for an arbitrary A matrix also, although it works more efficiently when A represents camera motion. Referring next to blocks 206-210, matrices F and G can be computed using Equation (54), matrices K and Y can be computed using Equation (55), matrices M, N, and L can be computed using Equation (51), and matrix E can be computed using Equation (54), wherein matrices E, F, G, M, N, and L are observer parameters and matrices K and Y are gain matrices.

Turning to block 212, an image of the object can be captured using a moving camera. Again, FIG. 2 schematically illustrates such image capture with a camera. By way of example, the object is a moving object and the camera is mounted to a further moving object, such as a UAV. Once the image is captured, feature points within the image are extracted, as indicated in block 214. By way of example, four coplanar feature points are extracted or eight non-coplanar feature points are extracted. In some embodiments, coplanar points can be identified using image segmentation techniques. With reference to block 216, the x and y pixel coordinates of each image feature point are recorded and, with reference to block 218, the linear velocity and linear acceleration of the camera motion at the time of image capture are recorded.

At this point, the Euclidean coordinates $m_j$ of the feature points are computed, as indicated in block 220. By way of example, those coordinates are determined using Equation (30). Referring next to block 222, an estimate for the state vector $[\hat{x}_1, \hat{x}_2, \hat{x}_3]$ is computed using the second relation of Equation (40), which relates the state vector to the pixel coordinates y, the auxiliary vector z, and the matrix E. As can be appreciated from the foregoing discussion, $\hat{x}_1$, is the inverse depth of the feature point (i.e., 1/Z), $\hat{x}_2$ is a ratio of the x and z coordinates (i.e., X/Z), and $\hat{x}_3$, is a ratio of the y and z coordinates (i.e., Y/Z). Next, X, is inverted to obtain the z coordinate of each feature point in the current camera coordinate frame, as indicated in block 224, and the relations $X=x_1/\hat{x}_3$ and $Y=x_2/\hat{x}_3$, are used to compute the x and y coordinates of each feature point in the current camera coordinate frame, as indicated in block 226.

At this point, auxiliary vector $[\hat{z}_1,\hat{z}_2,\hat{z}_3]$ is integrated using matrices N, L, M, and E, as indicated in block 228, to obtain a new auxiliary vector that can be used in the next iteration of the process (beginning with block 212). As indicated in decision block 230, if the estimation is to continue and a further image is to be captured, flow returns to block 212 of FIG. 9A.

Figure 10:
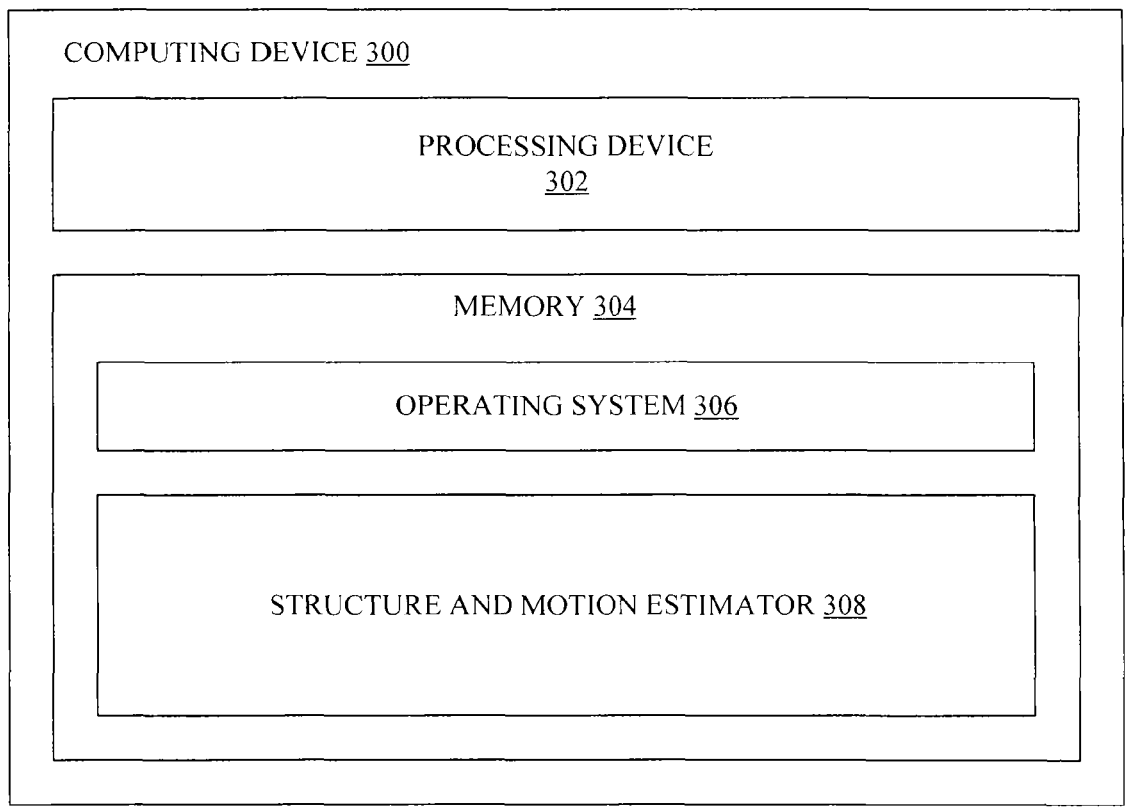
FIG. 10 is a block diagram of an embodiment of a computing device that can be used to estimate the structure and motion of an object.

FIG. 10 illustrates an example architecture for a computing device 300 that can be used to perform at least part of the processes described above. As indicated in FIG. 10, the computing device 300 at least comprises a processing device 302 and memory 304. The processing device 302 can include a central processing unit (CPU) or other processing device (e.g., microprocessor or digital signal processor) and the memory 304 includes any one of or a combination of volatile memory elements (e.g., RAM) and nonvolatile memory elements (e.g., flash, hard disk, ROM).

The memory 304 is a non-transitory computer-readable medium that stores various programs (i.e., logic), including an operating system 306 and an structure and motion estimator 308. The operating system 306 controls the execution of other programs and provides scheduling, input-output control, file and data management, memory management, and communication control and related services. The structure and motion estimator 308 comprises one or more algorithms that are configured to receive image data and analyze that image data to estimate the structure and motion of objects captured in the image data.

Although particular embodiments of systems and methods have been described in this disclosure, it is to be understood that various other embodiments are possible. All such embodiments are intended to fall within the scope of this disclosure.

We claim:

1. A method of operating a vehicle, the vehicle comprising a camera, the method comprising:
   estimating structure and motion relative to the camera of a stationary object, the estimating comprising:
   capturing first and second images of the object with the camera;
   recording a linear velocity and a linear acceleration of the camera at instants at which each image was captured;
   extracting matching feature points of the object from the images;
   computing Euclidean coordinates of the feature points for each image;
   estimating a rotation matrix based upon the Euclidean coordinates, the rotation matrix comprising a representation of rotation between the two images;
   computing an estimate of a state vector, the state vector being based upon the depths of the feature points relative to the camera and linear velocities of the camera; and
   computing unknown camera velocities and coordinates of each feature point based upon the state vector.

2. The method of claim 1, wherein recording a linear velocity and a linear acceleration comprises recording only a single linear velocity and a single linear acceleration in a single direction.

3. The method of claim 1, wherein computing Euclidean coordinates comprises computing the coordinates using pixel coordinates of the feature points and a camera calibration matrix.

4. The method of claim 1, wherein estimating a rotation matrix comprises first estimating a homography matrix that is a geometry transformation between the first and second images that encodes rotation and scaled translation information.

5. The method of claim 4, wherein estimating a rotation matrix further comprises decomposing the homography matrix to obtain the rotation matrix.

6. The method of claim 1, wherein computing an estimate of a state vector comprises first selecting an initial state vector and updating it based upon the depths.

7. The method of claim 1, further comprising selecting an initial rotation error vector.

8. The method of claim 7, further comprising computing the angular velocity of the camera based upon the rotation matrix.

9. The method of claim 8, wherein computing the angular velocity of the camera further comprises computing an estimate of a rotation error vector and an estimate of the derivative of the rotation error vector.

10. A non-transitory computer-readable medium that stores a controller for controlling operation of a vehicle, the vehicle comprising a camera, the medium comprising:
    a structure and motion estimator to estimate the structure and motion of a stationary object relative to the camera, the structure and motion estimator comprising:
    logic configured to capture first and second images of the stationary object with the camera of the vehicle;
    logic configured to record a linear velocity and a linear acceleration of the camera at instants at which each image was captured;
    logic configured to extract matching feature points of the object from the images;
    logic configured to compute Euclidean coordinates of the feature points for each image; logic configured to estimate a rotation matrix based upon the Euclidean coordinates, the rotation matrix comprising a representation of rotation between the two images;
    logic configured to compute an estimate of a state vector, the state vector being based upon the depths of the feature points relative to the camera and linear velocities of the camera; and
    logic configured to compute unknown camera velocities and coordinates of each feature point based upon the state vector.

11. The computer-readable medium of claim 10, wherein the logic configured to compute Euclidean coordinates comprises logic configured to compute the coordinates using pixel coordinates of the feature points and a camera calibration matrix.

12. The computer-readable medium of claim 10, wherein the logic configured to estimate a rotation matrix comprises logic configured to estimate a homography matrix that is a geometry transformation between the first and second images that encodes rotation and scaled translation information.

13. The computer-readable medium of claim 12, wherein the logic configured to estimate a rotation matrix further comprises logic configured to decompose the homography matrix to obtain the rotation matrix.

14. The computer-readable medium of claim 10, wherein the logic configured to compute an estimate of a state vector comprises logic configured to select an initial state vector and update it based upon the depths.

15. The computer-readable medium of claim 10, further comprising logic configured to select an initial rotation error vector.

16. The computer-readable medium of claim 15, further comprising logic configured to compute the angular velocity of the camera based upon the rotation matrix.

17. The computer-readable medium of claim 16, wherein the logic configured to compute the angular velocity of the camera further comprises logic configured to compute an estimate of a rotation error vector and an estimate of the derivative of the rotation error vector.

18. A method of operating a vehicle, the vehicle comprising a camera, the method comprising:
estimating the structure and motion relative to the camera of a stationary object, the estimating comprising:
capturing an image of the object with the camera;
recording linear and angular velocities of the camera at an instant at which the image was captured;
extracting feature points of the object from the image;
computing Euclidean coordinates of the feature points;
computing a state vector $[\hat{x}_1, \hat{x}_2, \hat{x}_3]$, wherein $x_1$ is the inverse depths of the feature points, $x_2$ is the ratios of x and z coordinates of the feature points, and $\hat{x}_3$ is the ratios of y and z coordinates of the feature points;
determining z coordinates of each feature point in the image based upon the state vector; and
computing x and y coordinates of each feature point in the image based upon the state vector.

19. The method of claim 18, wherein computing Euclidean coordinates comprises computing the coordinates using pixel coordinates of the feature points and a camera calibration matrix.

20. The method of claim 18, wherein computing a state vector $[\hat{x}_1, \hat{x}_2, \hat{x}_3]$ comprises computing the state vector using pixel coordinates of the feature points, an auxiliary vector, and an observer parameter.

21. The method of claim 18, wherein determining z coordinates comprises inverting $\hat{x}_3$.

22. The method of claim 18, wherein computing x and y coordinates comprises computing the coordinates using the following relations:

$$X = x_1/\hat{x}_3, \text{ and}$$

$$Y = x_2/\hat{x}_3$$

wherein X is the x coordinate and Y is the y coordinate.

23. The method of claim 18, further comprising selecting an initial auxiliary vector prior to computing the state vector $[\hat{x}_1, \hat{x}_2, \hat{x}_3]$.

24. The method of claim 18, further comprising, prior to computing the state vector, choosing a matrix D, which is a representation of the rotation of the object relative to the camera.

25. The method of claim 24, further comprising choosing a matrix A, which is a representation of the linear and angular velocities of the camera.

26. The method of claim 25, further comprising computing observer parameter and gain matrices.

27. A non-transitory computer-readable medium that stores a controller for controlling operation of a vehicle, the vehicle comprising a camera, the medium comprising:
a structure and motion estimator to estimate the structure and motion of a stationary object relative to the camera, the structure and motion estimator comprising:
logic configured to capture an image of the stationary object with the camera of the vehicle;
logic configured to record linear and angular velocities of the camera at an instant at which the image was captured;
logic configured to extract feature points of the object from the image;
logic configured to compute Euclidean coordinates of the feature points;
logic configured to compute a state vector $[\hat{x}_1, \hat{x}_2, \hat{x}_3]$, wherein $x_1$ is the inverse depths of the feature points, $x_2$ is the ratios of x and z coordinates of the feature points, and $\hat{x}_3$ is the ratios of y and z coordinates of the feature points;
logic configured to determine z coordinates of each feature point in the image based upon the state vector; and
logic configured to compute x and y coordinates of each feature point in the image based upon the state vector.

28. The computer-readable medium of claim 27, wherein the logic configured to compute Euclidean coordinates comprises logic configured to compute the coordinates using pixel coordinates of the feature points and a camera calibration matrix.

29. The computer-readable medium of claim 27, wherein the logic configured to compute a state vector $[\hat{x}_1, \hat{x}_2, \hat{x}_3]$ comprises logic configured to compute the state vector using pixel coordinates of the feature points, an auxiliary vector, and an observer parameter.

30. The computer-readable medium of claim 27, wherein the logic configured to determine z coordinates comprise logic configured to invert $\hat{x}_3$.

31. The computer-readable medium of claim 27, wherein logic configured to computing x and y coordinates comprises logic configured to computing the coordinates using the following relations:

$$X = x_1/\hat{x}_3, \text{ and}$$

$$Y = x_2/\hat{x}_3$$

wherein X is the x coordinate and Y is the y coordinate.

32. The computer-readable medium of claim 27, further comprising logic configured to select an initial auxiliary vector prior to computing the state vector $[\hat{x}_1, \hat{x}_2, \hat{x}_3]$.

33. The computer-readable medium of claim 27, further comprising logic configured to, prior to computing the state vector, choose a matrix D, which is a representation of the rotation of the object relative to the camera.

34. The computer-readable medium of claim 33, further comprising logic configured to choose a matrix A, which is a representation of the linear and angular velocities of the camera.

35. The computer-readable medium of claim 34, further comprising logic configured to compute observer parameter and gain matrices.

* * * * *